(12) United States Patent
Nuckolls et al.

(10) Patent No.: US 12,104,114 B2
(45) Date of Patent: Oct. 1, 2024

(54) SOLUTION-PROCESSABLE SUPERATOMIC THIN-FILMS

(71) Applicants: THE TRUSTEES OF COLUMBIA UNIVERSITY IN THE CITY OF NEW YORK, New York, NY (US); CARNEGIE MELLON UNIVERSITY, Pittsburgh, PA (US)

(72) Inventors: Colin Nuckolls, New York, NY (US); Jingjing Yang, New York, NY (US); Alexander D. Christodoulides, Pittsburg, PA (US); Boyuan Zhang, New York, NY (US); Qizhi Xu, New York, NY (US); Amirali Zangiabadi, New York, NY (US); Christine McGinn, New York, NY (US); Samuel Peurifoy, New York, NY (US); Lingyun Dai, Pittsburgh, PA (US); Elena Meirzadeh, New York, NY (US); Michael Steigerwald, Martinsville, NJ (US); Xavier Roy, New York, NY (US); Ioannis Kymissis, New York, NY (US); Jonathan A. Malen, Pittsburg, PA (US)

(73) Assignee: The Trustees of Columbia University in the City of New York, New York, NY (US)

( * ) Notice: Subject to any disclaimer, the term of this patent is extended or adjusted under 35 U.S.C. 154(b) by 102 days.

(21) Appl. No.: 16/917,758

(22) Filed: Jun. 30, 2020

(65) Prior Publication Data
US 2021/0002536 A1    Jan. 7, 2021

Related U.S. Application Data

(60) Provisional application No. 62/869,368, filed on Jul. 1, 2019.

(51) Int. Cl.
*C09K 5/14* (2006.01)
*C09D 5/00* (2006.01)

(52) U.S. Cl.
CPC ............... *C09K 5/14* (2013.01); *C09D 5/00* (2013.01)

(58) Field of Classification Search
CPC ............ C09K 5/14; C09D 5/00; C07F 15/06; C07F 15/065; C07F 15/04; C07F 15/045; C07F 13/00; C07F 13/005; C07F 11/00; C07F 11/005; C07F 11/12; C07F 9/28; C01B 19/007; C01B 19/002; C01G 7/006; C01G 37/006; C01G 47/006; C01G 51/006; C01G 53/006

See application file for complete search history.

(56) References Cited

U.S. PATENT DOCUMENTS 9,586,281 B2 * 3/2017 Aoki ...................... C22C 13/00

OTHER PUBLICATIONS

O'Brien et al. "Single-crystal-to-single-crystal intercalation of a low-bandgap superatomic crystal", Nature Chemistry, 9, 1170-1174 (2017). Published online Aug. 14, 2017 (Year: 2017).*
Yang et al. "Solution-Processable Superatomic Thin-Films", JACS, 2019, 141, 10967-10971. Published online Jul. 1, 2019 (Year: 2019).*
O'Brien et al. "Spontaneous Electronic Band Formation and Switchable Behaviors in a Phase-Rich Superatomic Crystal", JACS, 2018, 140, 15601-15605. published online Nov. 12, 2018 (Year: 2018).*
Liang et al. "Fullerene rotational dynamics generate disordered configurations that suppress thermal conductivity in superatomic crystals", Nanoscale Horizons (RSOC), 2020, 5, 1524-1529. Published online Sep. 4, 2020 (Year: 2020).*
Champsaur et al. "Building Diatomic and Triatomic Superatom Molecules" Nano Letters, 2016, 16, 5273-5277. Published online Jul. 13, 2016 (Year: 2016).*
Xiong et al. "The Role of Super-Atom Molecular Orbitals in Doped Fullerenes in a Femtosecond Intense Laser Field", Scientific Reports, 7, 121 (2017). Published online Mar. 9, 2017 (Year: 2017).*
Voevodin et al. "Dimerization of Endohedral Fullerene in a Superatomic Crystal", Chemistry European Journal, 2017, 23, 13305-13308. Published online Aug. 28, 2017 (Year: 2017).*
Pinkard et al., "Molecular Clusters: Nanoscale Building Blocks for Solid-State Materials," Acc. Chem. Res. 51:919-929 (2018).
Reber et al., "Co6Se8(PEt3)6 superatoms as tunable chemical dopants for two-dimensional semiconductors," npj Computational Materials 4:33 (2018) 6 pages.

* cited by examiner

Primary Examiner — Jane L Stanley
(74) Attorney, Agent, or Firm — Baker Botts LLP

(57) ABSTRACT

Ionic superatomic materials that can be solution-processed into completely amorphous and homogeneous thin films are disclosed herein. The amorphous materials disclosed herein have tunable compositions and have electrical conductivities of up to 300 siemens per meter, thermal conductivities of 0.05 watt per meter per degree Kelvin, and optical transparencies of up to 92%. Application of these thin-films are also provided herein.

17 Claims, 32 Drawing Sheets

SOLUTION-PROCESSABLE SUPERATOMIC THIN-FILMS

CROSS-REFERENCE TO RELATED APPLICATIONS

This application claims priority to U.S. Provisional Patent Application Ser. No. 62/869,368, filed Jul. 1, 2019 which is hereby incorporated by reference in its entirety.

GRANT INFORMATION

This invention was made with government support under grant numbers DMR-1420634 awarded by the National Science Foundation (NSF), DA9550-18-1-0020 awarded by the Air Force Office of Scientific Research (AFOSR), and 71641-MS awarded by the U.S. Army Research Office (ARO). The government has certain rights in the invention.

BACKGROUND

Certain nanoscale clusters can be used as programmable superatomic building blocks. For example, certain nanoscale clusters can be used to assemble functional materials with various properties. Some nanoscale clusters can assemble into ionic crystals with collective electrical transport and magnetic properties through electron transfer between the constituent clusters. Formation of superatomic ionic crystals can be dominated by the electrostatic interactions between the constituent clusters and this can result in the crystallization of ionic pairs making them unsuitable for use as functional material in a device.

Thus, there is a need for improved techniques for superatomic materials that can be solution-processable and can produce amorphous superatomic thin films.

SUMMARY

The disclosed subject matter provides solution-processable superatomic thin-films and methods for producing thereof.

In certain embodiments, the disclosed subject matter provides an ionic superatomic material. The ionic superatomic material can include a metal-containing superatom and a fullerene derivative. The metal-containing superatom can be selected from the group consisting of metal chalcogenide clusters such as $Co_6Se_8(PR_1R_2R_3)_6$, $Co_6Te_8(PR_1R_2R_3)_6$, $Ni_9Te_6(PR_1R_2R_3)_8$, $Cr_6Se_8(PR_1R_2R_3)_6$, $Cr_6Te_8(PR_1R_2R_3)_6$, $Re_6Se_8(PR_1R_2R_3)_6$, $Re_6Te_8(PR_1R_2R_3)_6$, $Au_{25}(SR)_{18}$, $Au_{38}(SR)_{24}$, or derivatives thereof. In non-limiting embodiments, the $R_1$, $R_2$, and $R_3$ can be independently a straight of branched chain C3-C20 alkyl group. In non-limiting embodiments, the $R_1$, $R_2$, and $R_3$ can be n-propyl.

In certain embodiments, the fullerene derivative can be selected from the group consisting of $C_{20}$, $C_{60}$, $C_{70}$, $C_{72}$, $C_{74}$, $C_{76}$, $C_{78}$, $C_{80}$, $C_{82}$, $C_{84}$, $C_{86}$, $C_{88}$, $C_{90}$, PCBM, C60-COOH, C70-COOH, pyrazolino[60]fullerene, methano[60]fullerene, isoxazolino[60]fullerene, [60]ThCBM, [60]PCB-C8, [60]PCB-C4, [70]PCBM, and derivatives thereof. In non-limiting embodiments, the fullerene derivative can be [6,6]-phenyl-C61-butyric acid methyl ester.

In certain embodiments, the ratio of the metal-containing superatom to the fullerene derivative is adjusted to control properties of ionic superatomic material. In non-limiting embodiments, the ionic superatomic material can be $[Co_6Te_8(PPr_3)_6][Co6Te8(PPr3)6][[6,6]$-phenyl-C61-butyric acid methyl ester]x. The x can be 2, 3, 4, 5, 7, or 9.

In certain embodiments, the disclosed subject matter provides an amorphous thin film. The amorphous thin film can include the disclosed superatomic material. The thin film can have a thermal conductivity of about 0.05 W m-1K-1. In non-limiting embodiments, the amorphous thin film can have optical transparency of up to 92% in a visible spectrum. In some embodiments, the amorphous thin film can have optical transparency of from about 75% to about 85% at 550 nm.

In certain embodiments, the disclosed subject matter provides a consumer product. The consumer product can include the disclosed amorphous thin film. In non-limiting embodiments, the consumer product can be wearable electronics, stretchable and flexible electronics, smart robotics systems, transparent thermal insulation coatings, printable electronics, touch screen devices, thin-film thermoelectric devices, or temperature sensors.

In certain embodiments, the disclosed subject matter provides a method for controlling electrical conductivity of an amorphous thin film, which can include $Co_6Te_8(PR_1R_2R_3)_6$ and a fullerene derivative. The method can include mixing the $Co_6Te_8(PR_1R_2R_3)_6$ and the fullerene derivative in a ratio of from about 1:1 to about 1:10. In non-limiting embodiments, the $Co_6Te_8(PR_1R_2R_3)_6$ and the fullerene derivative can be mixed in a ratio of about 1:5. In some embodiments, the amorphous thin film can comprise $[C_6Te_8(PPr_3)6][6,6]$-phenyl-C61-butyric acid methyl ester$]_5$.

In certain embodiments, the disclosed subject matter provides a method of controlling thermal conductivity of an amorphous thin film, which can include $Co_6Te_8(PR_1R_2R_3)_6$ and a fullerene derivative. The method can include adjusting a ratio of $Co_6Te_8(PR_1R_2R_3)_6$ and a fullerene derivative.

DETAILED DESCRIPTION

Figure 1A:
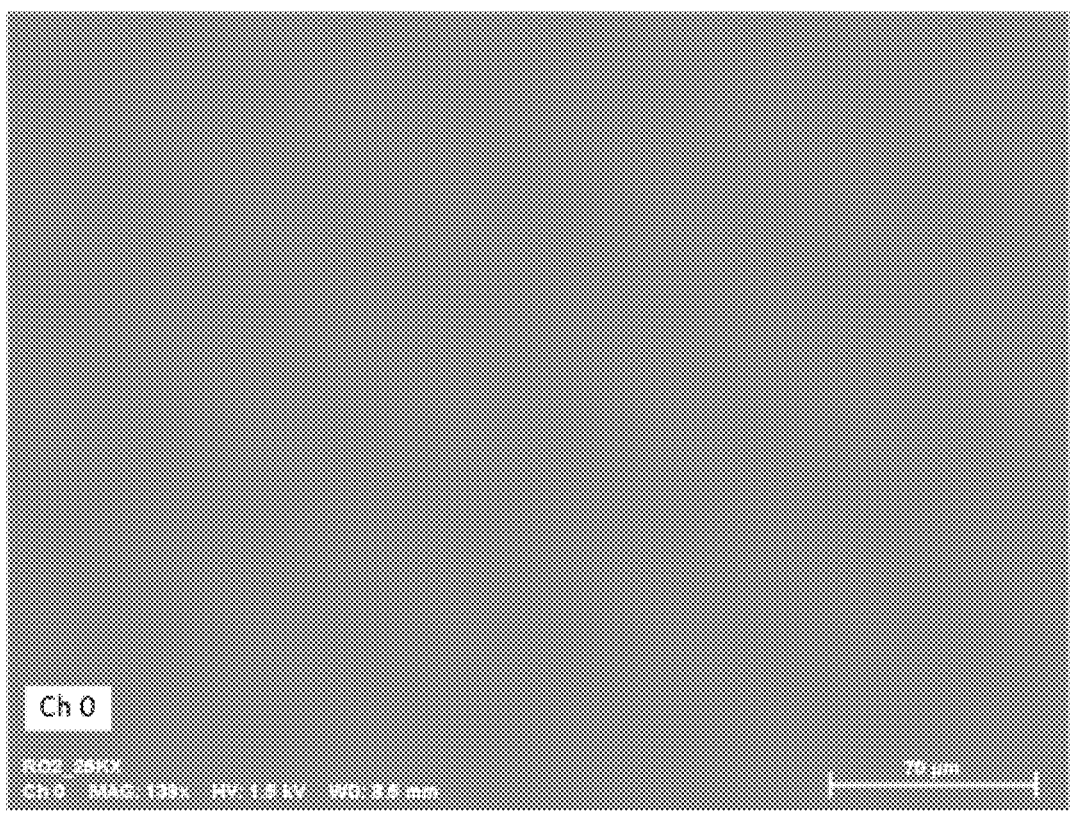
FIG. 1A provides an SEM image of film $[Co][PCBM]_2$ spin-coated on silicon wafer.
Figure 1B:
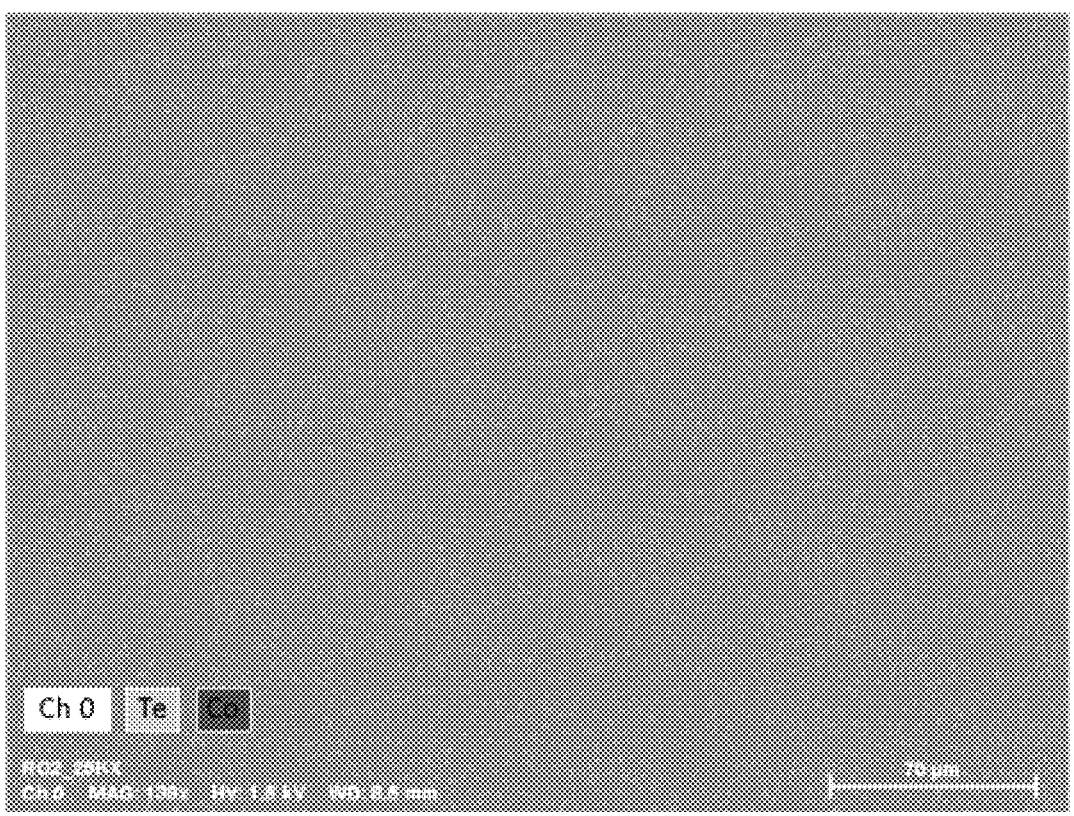
FIG. 1B shows distribution of Cobalt and Tellurium in film $[Co][PCBM]_2$.
Figure 2A:
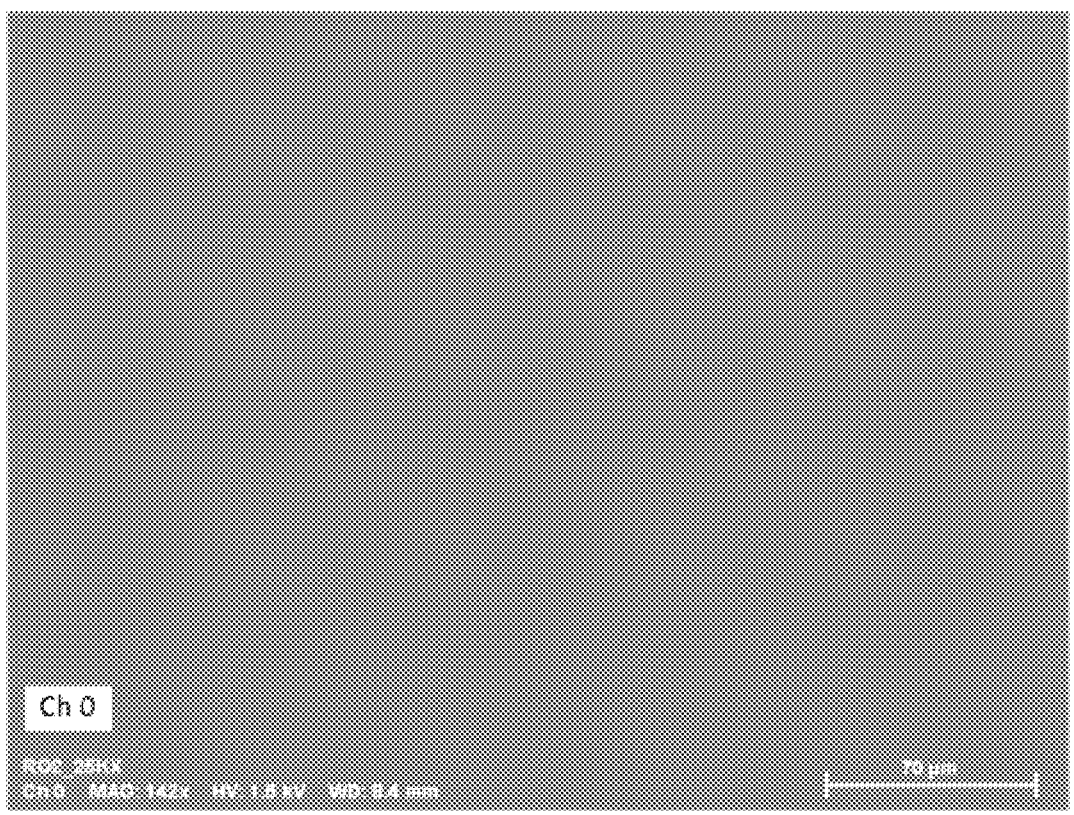
FIG. 2A provides an SEM image of film $[Co][PCBM]_3$ spin-coated on silicon wafer.
Figure 2B:
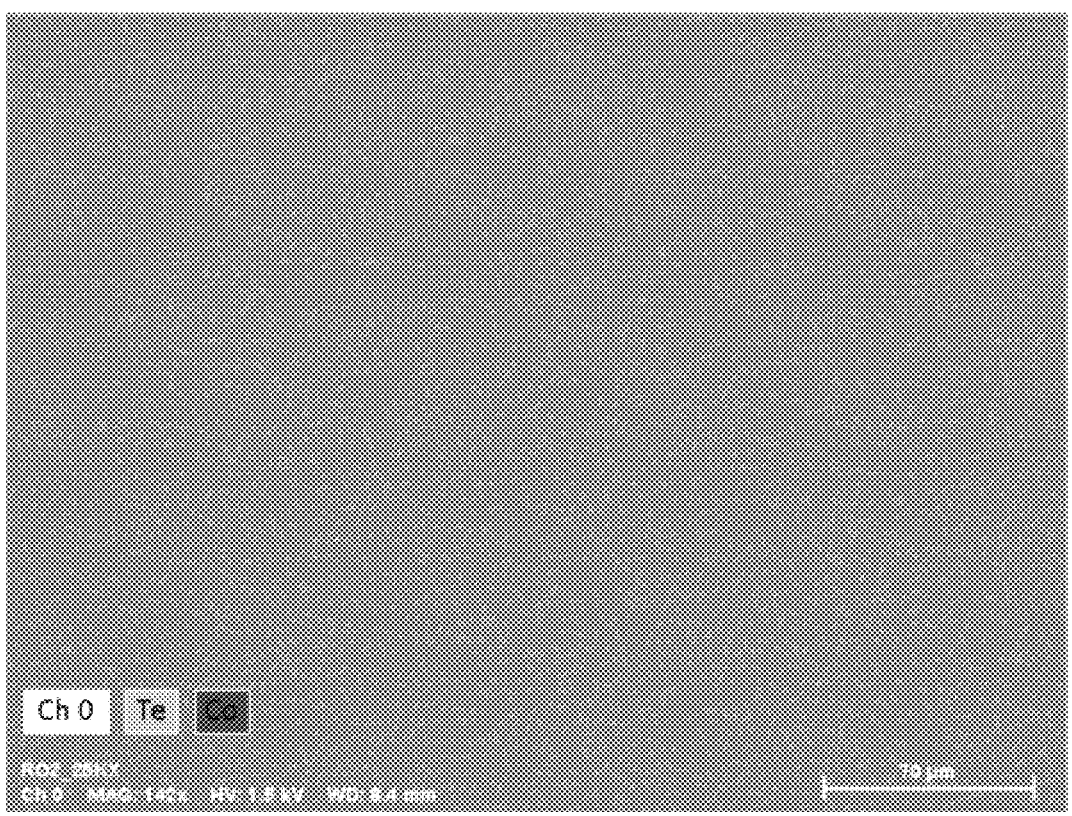
FIG. 2B shows distribution of Cobalt and Tellurium in film $[Co][PCBM]_3$.
Figure 3A:
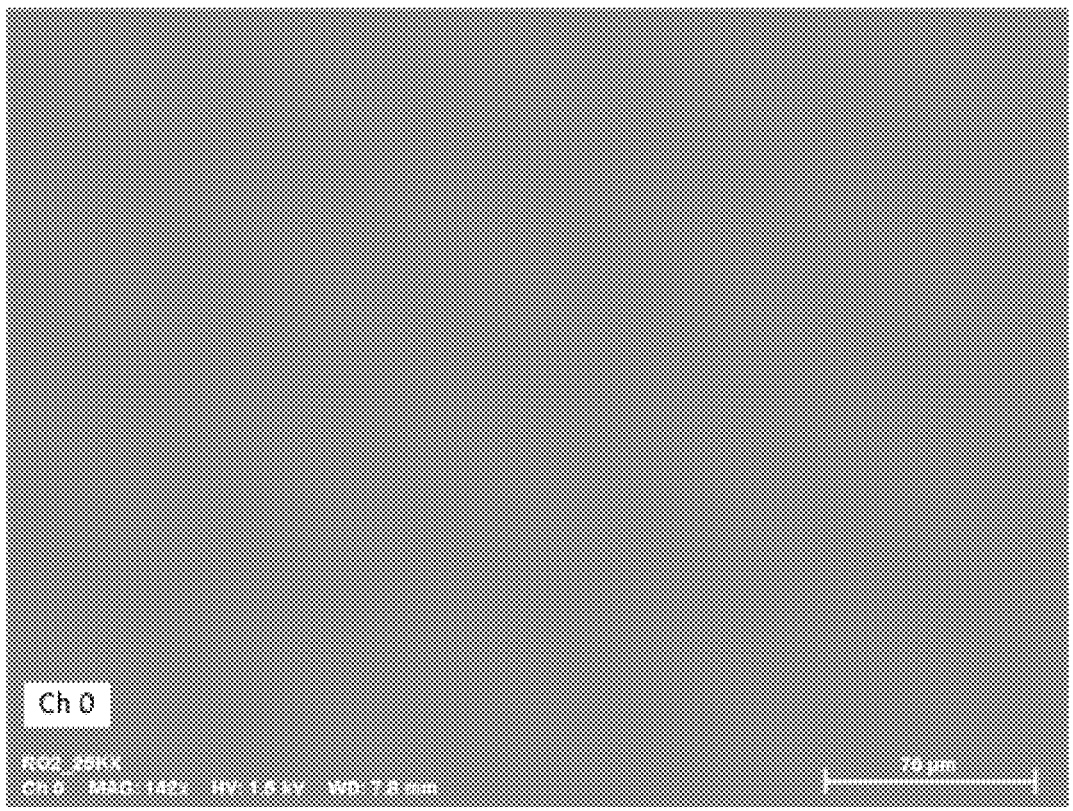
FIG. 3A provides an SEM image of film $[Co][PCBM]_4$ spin-coated on silicon wafer.
Figure 3B:
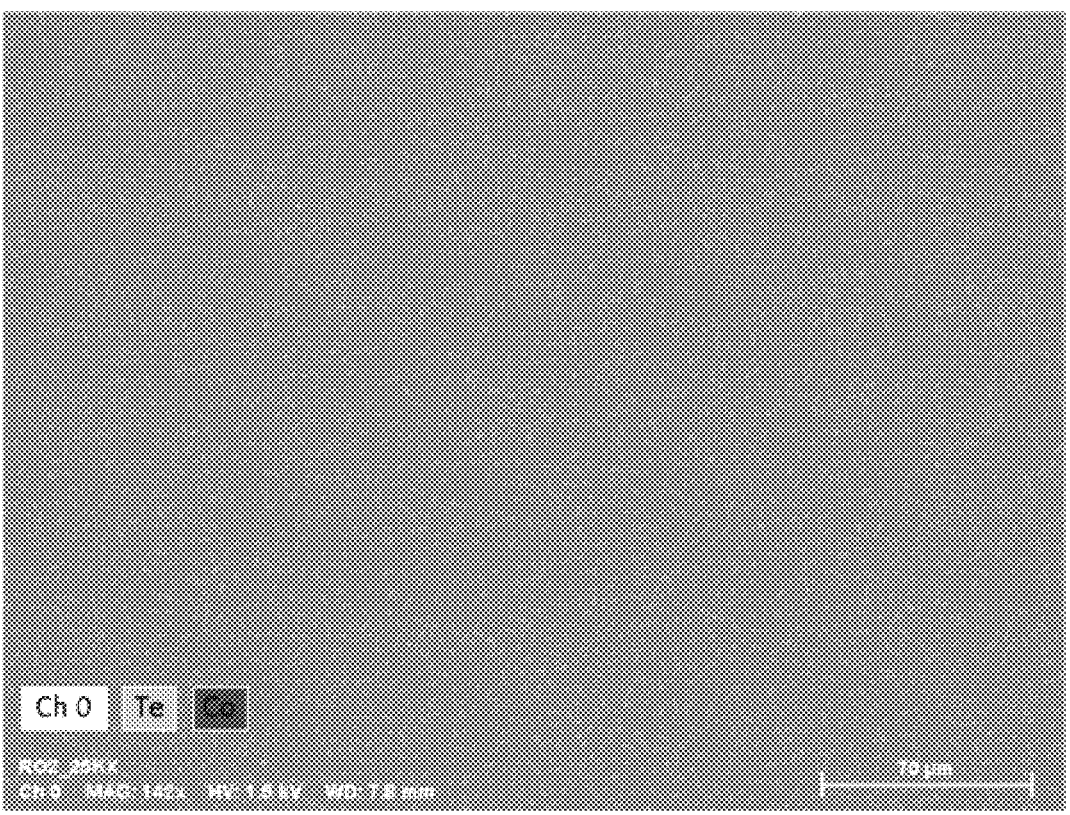
FIG. 3B shows distribution of Cobalt and Tellurium in film $[Co][PCBM]_4$.
Figure 4A:
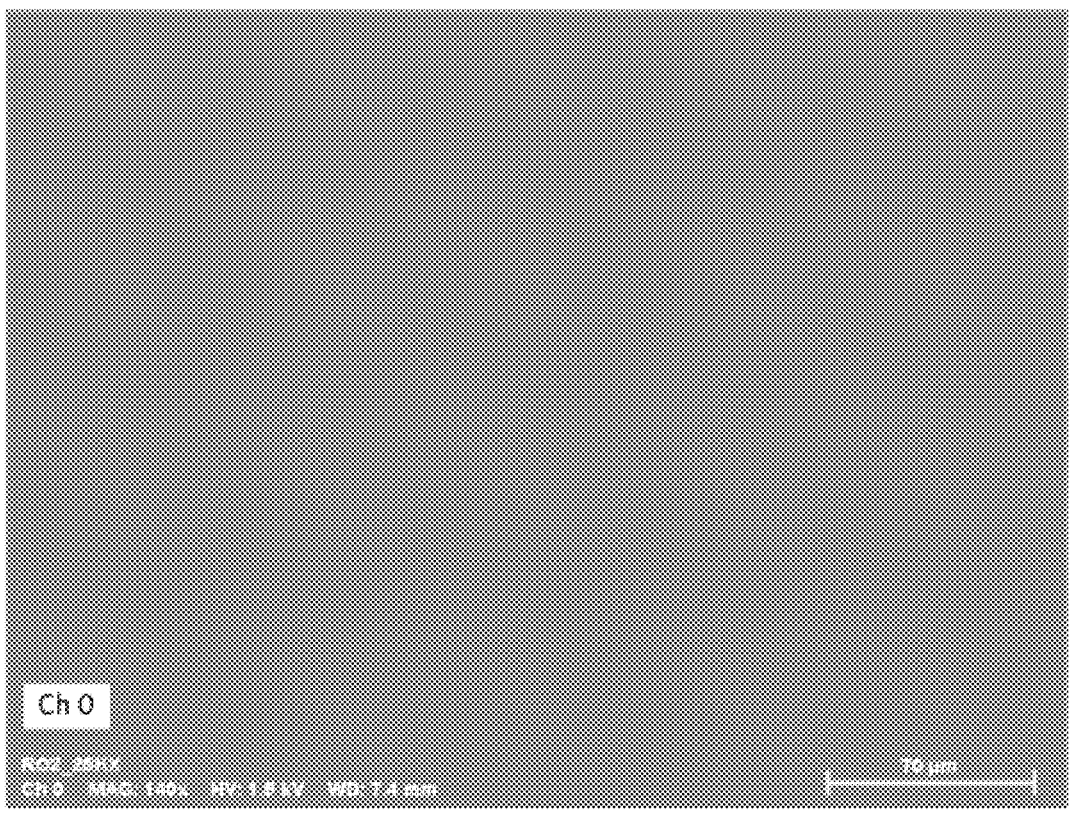
FIG. 4A provides an SEM image of film $[Co][PCBM]_5$ spin-coated on silicon wafer.
Figure 4B:
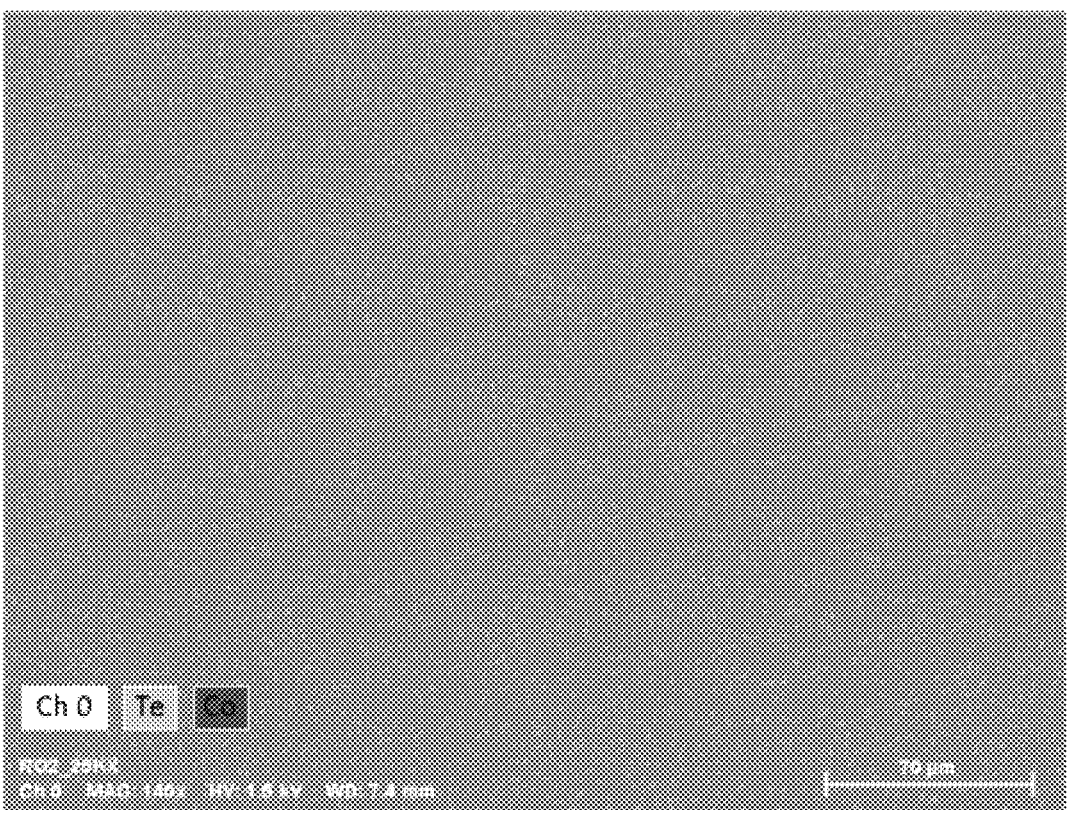
FIG. 4B shows distribution of Cobalt and Tellurium in film [Co][PCBM]s.
Figure 5A:
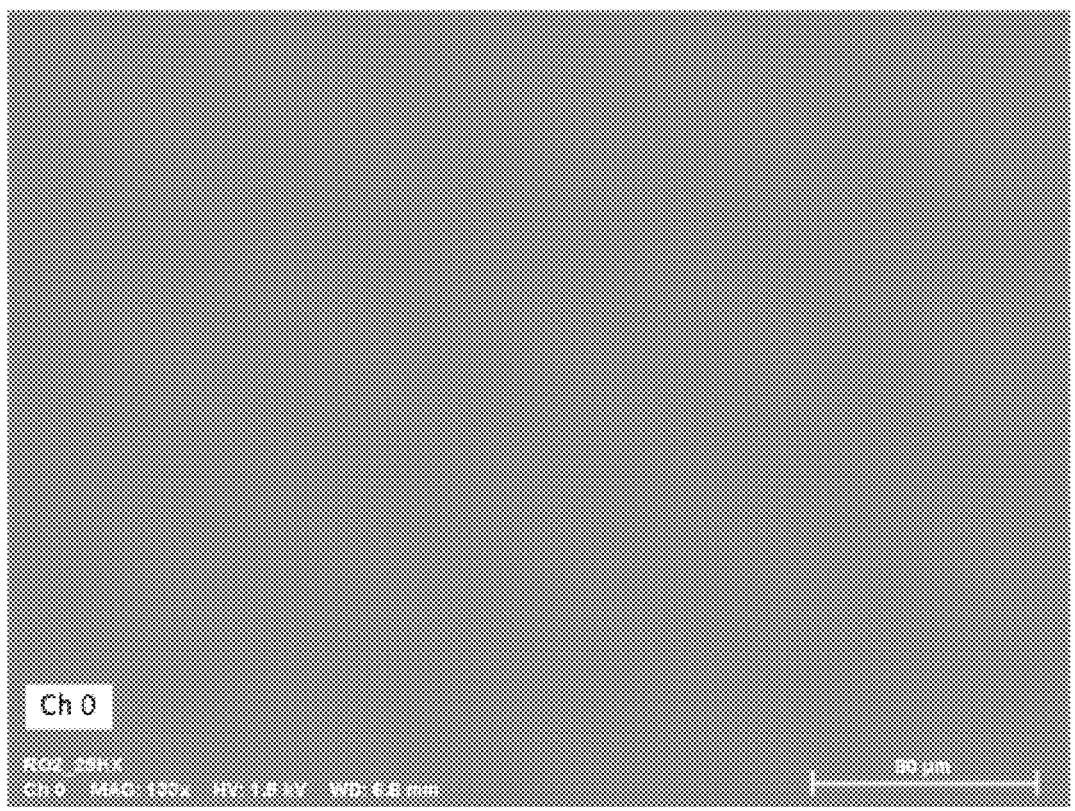
FIG. 5A provides an SEM image of film $[Co][PCBM]_7$ spin-coated on silicon wafer.
Figure 5B:
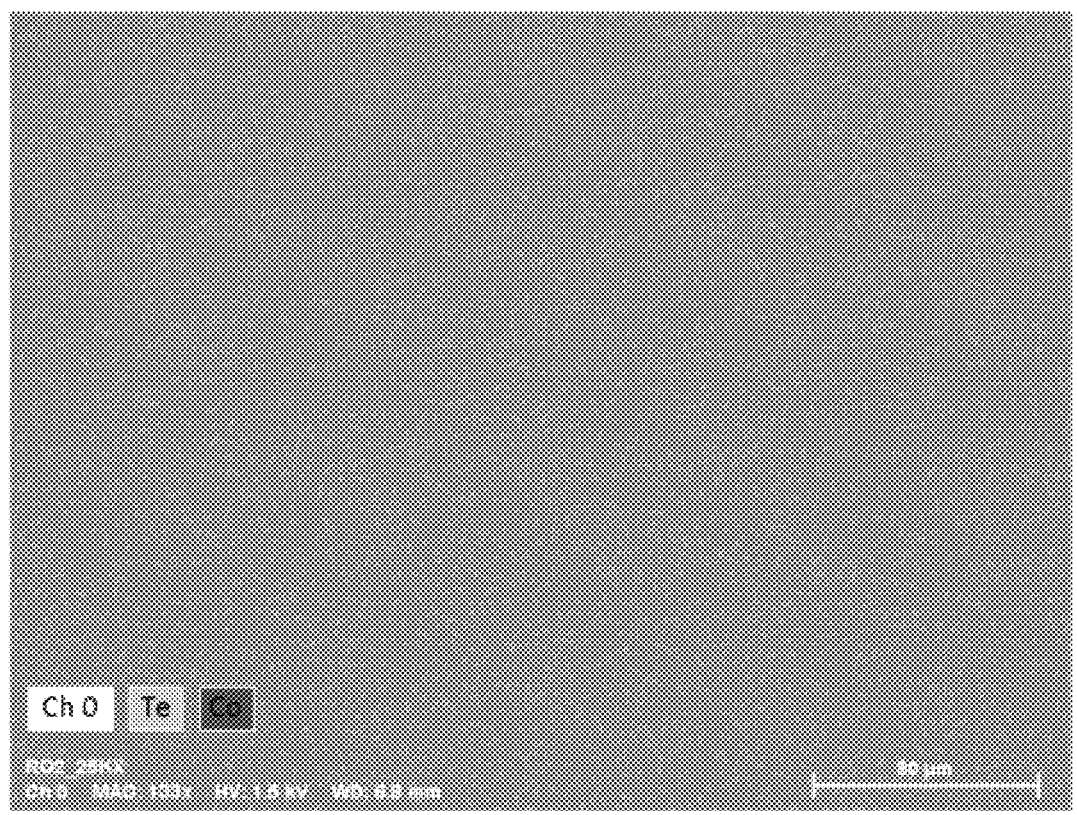
FIG. 5B shows distribution of Cobalt and Tellurium in film $[Co][PCBM]_7$.
Figure 6A:
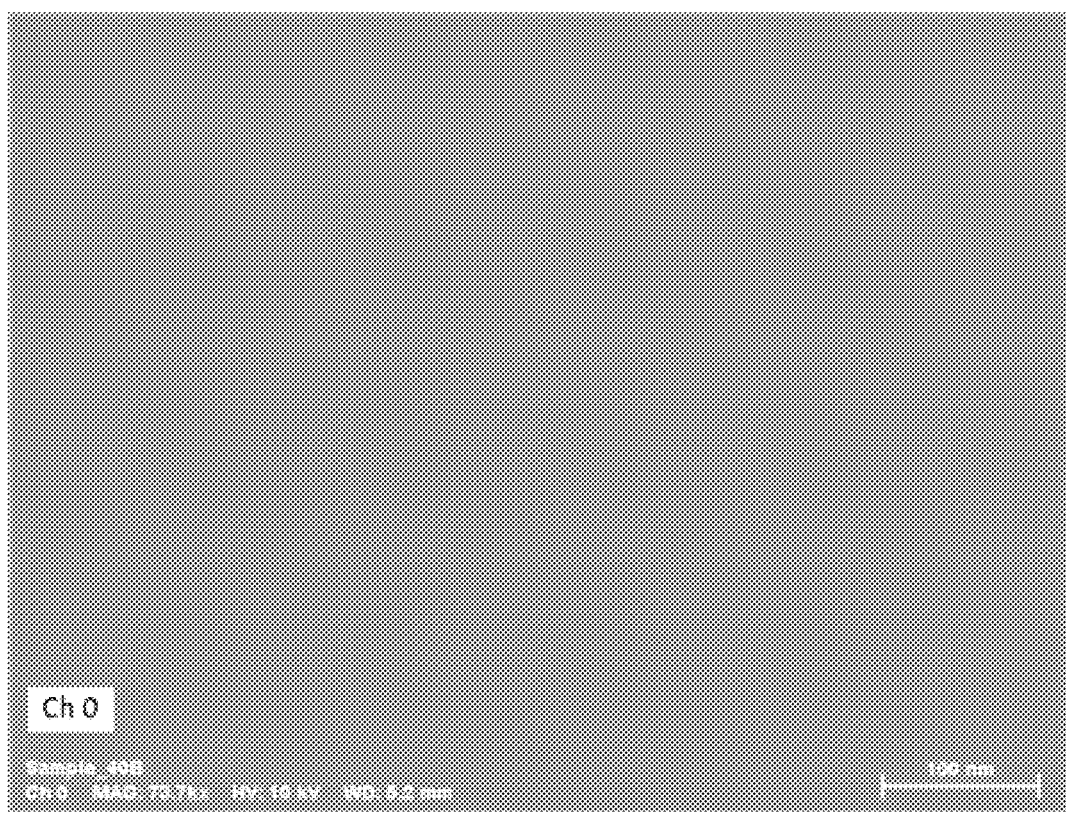
FIG. 6A provides an SEM image of film $[Co][PCBM]_9$ spin-coated on silicon wafer.
Figure 6B:
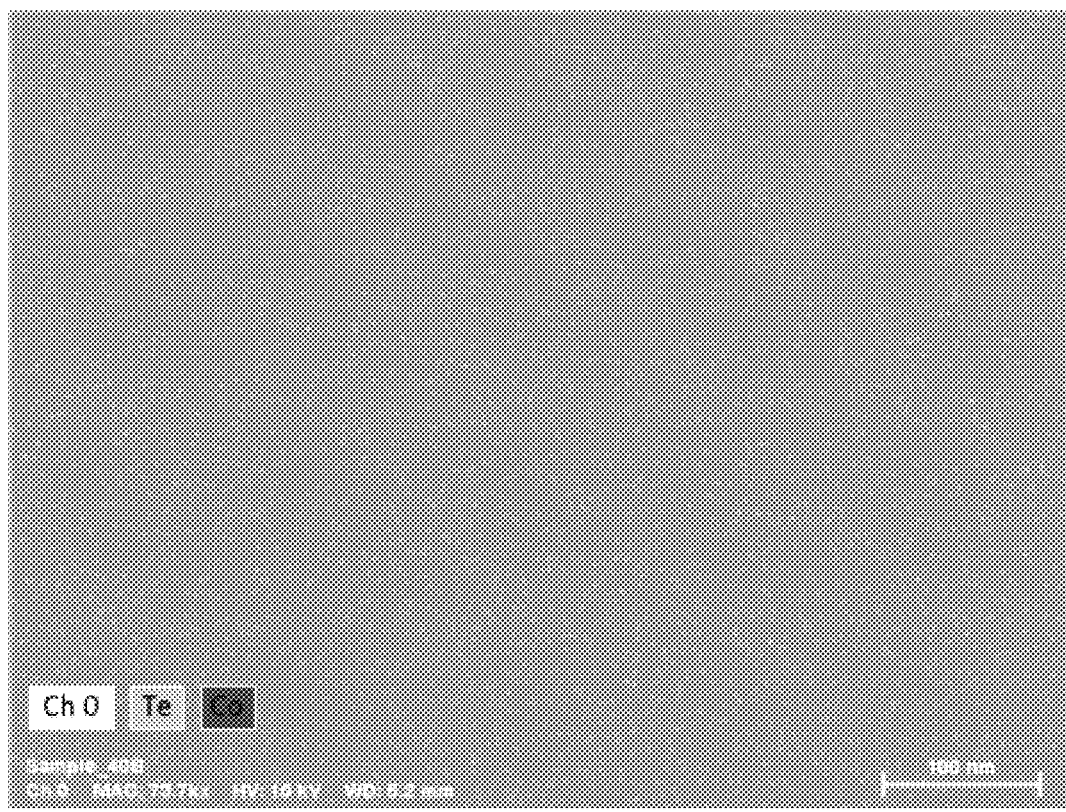
FIG. 6B shows distribution of Cobalt and Tellurium in film $[Co][PCBM]_9$.
Figure 7:
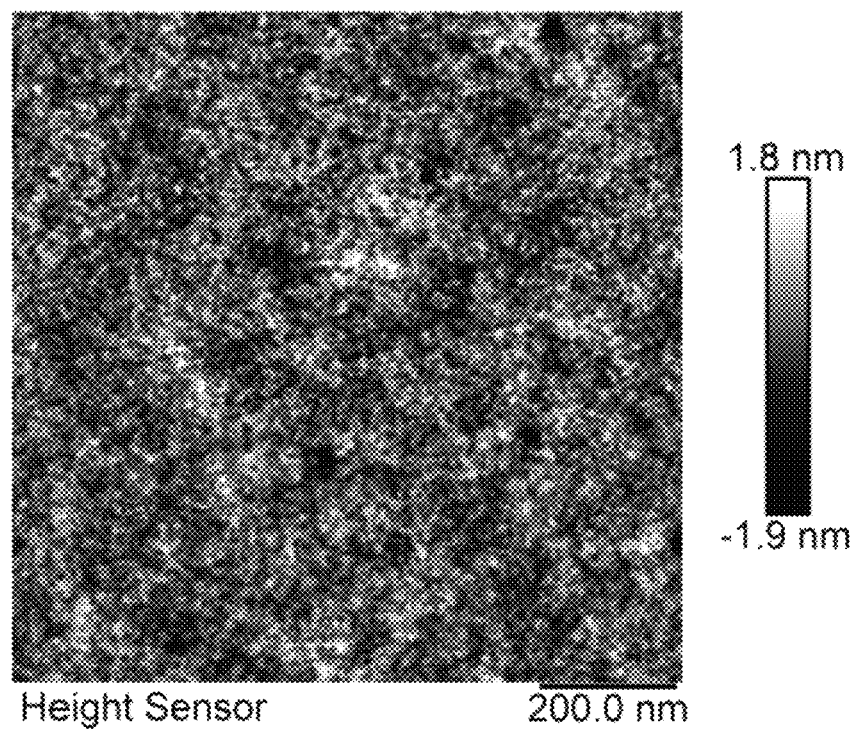
FIG. 7 provides an AFM image of film $[Co][PCBM]_2$ spin-coated on silicon wafer. The RMS roughness is 0.529 nm.
Figure 8:
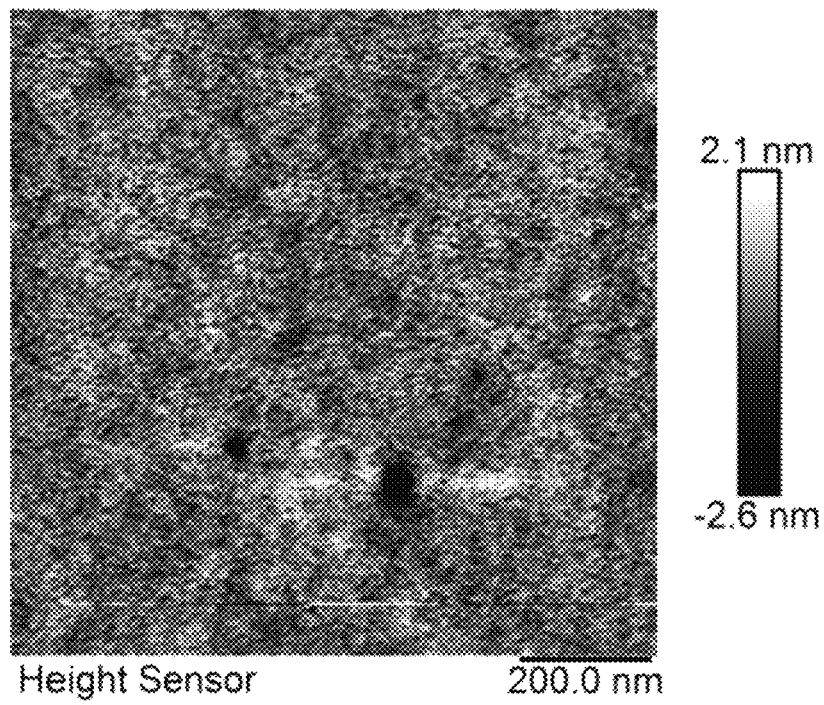
FIG. 8 provides an AFM image of film $[Co][PCBM]_3$ spin-coated on silicon wafer. The RMS roughness is 0.710 nm.
Figure 9:
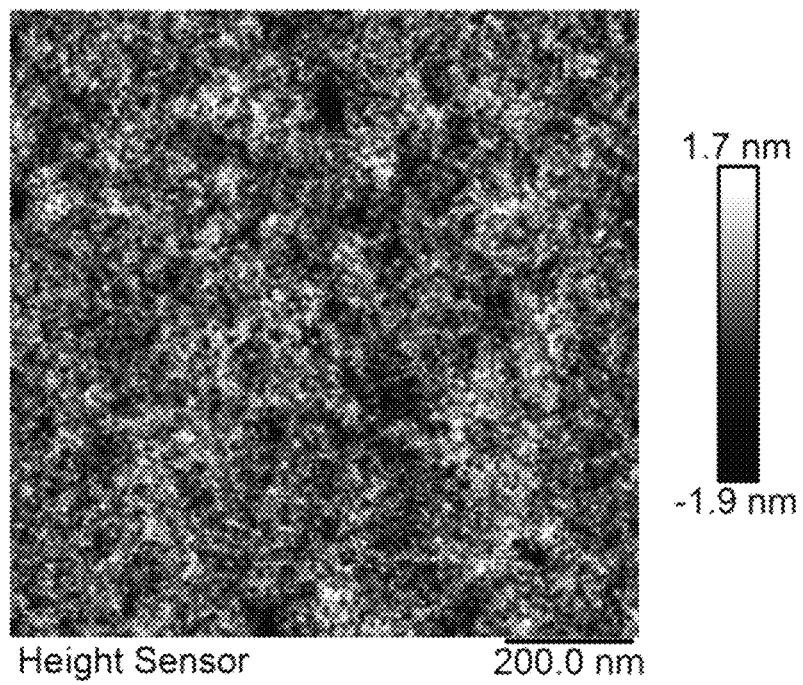
FIG. 9 provides an AFM image of film [Co][PCBM]$_4$ spin-coated on silicon wafer. The RMS roughness 0.529 nm.
Figure 10:
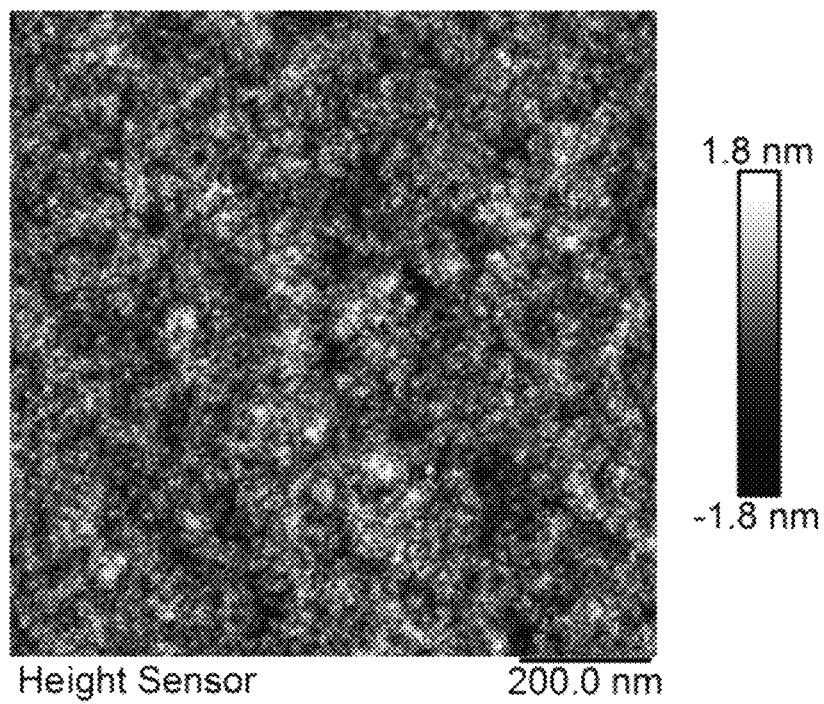
FIG. 10 provides an AFM image of film [Co][PCBM]$_5$ spin-coated on silicon wafer. The RMS roughness 0.506 nm.
Figure 11:
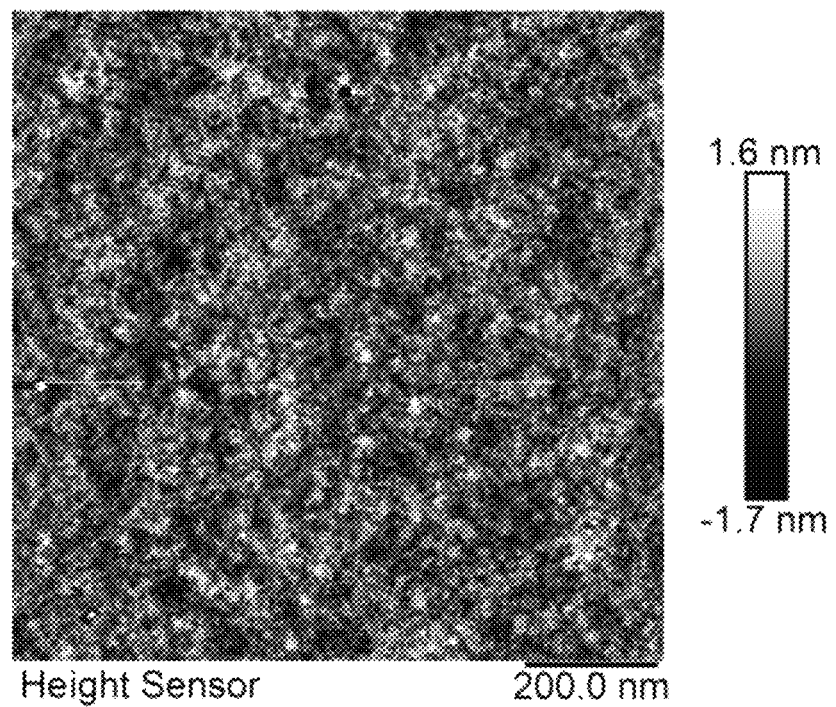
FIG. 11 provides an AFM image of film [Co][PCBM]$_7$ spin-coated on silicon wafer. The RMS roughness is 0.483 nm.
Figure 12:
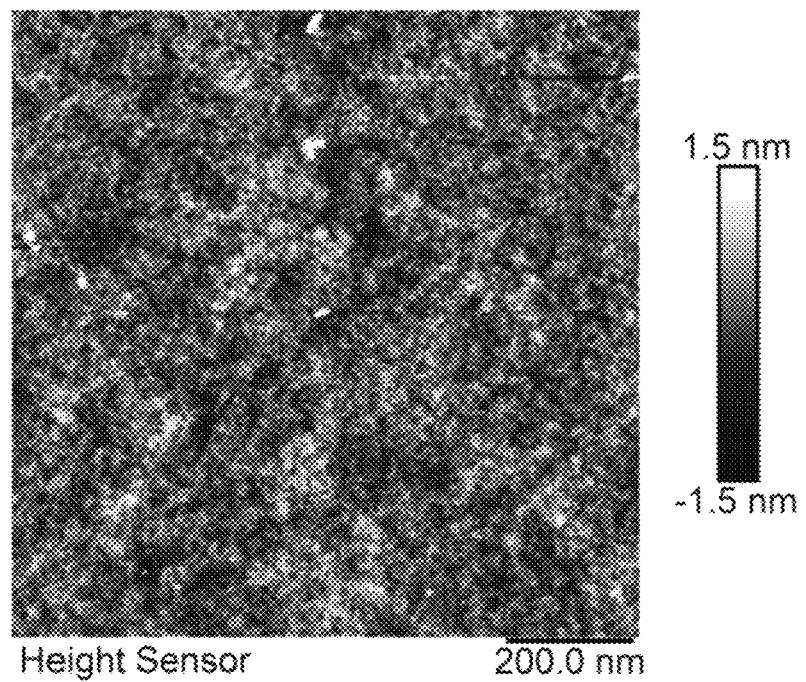
FIG. 12 provides an AFM image of film [Co][PCBM]$_9$ spin-coated on silicon wafer. The RMS roughness is 0.466 nm.

The disclosed subject matter provides solution-processable superatomic thin-films and methods for producing thereof. For example, but not by the way of limitation, the present disclosure provides solution-processable superatomic thin-films which can be amorphous and/or homogenous.

Definitions

The terms used in this specification generally have their ordinary meanings in the art, within the context of the disclosed subject matter and in the specific context where each term is used. Certain terms are discussed below, or elsewhere in the specification, to provide additional guidance in describing the compositions and methods of the disclosed subject matter and how to make and use them.

As used herein, the use of the word "a" or "an" when used in conjunction with the term "comprising" in the claims and/or the specification can mean "one," but it is also consistent with the meaning of "one or more," "at least one," and "one or more than one." Still further, the terms "having," "including," "containing" and "comprising" are interchangeable and one of skill in the art is cognizant that these terms are open ended terms.

The term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, up to 10%, up to 5%, and still up to 1% of a given value.

As used herein, the term "superatom" refers to nanoscale clusters of bounded atoms that can be considered as 'artificial atoms' to construct functional materials.

As used herein, the term "uniform" refers to means flat and smooth surfaces, with no particles, no aggregates, no holes, etc.

As used herein and understood in the art, "visible range" or "visible spectrum" refers to the portion of the electromagnetic spectrum that is visible to the human eye and has wavelengths of from about 380 to 740 nanometers.

Thin-Films

In certain embodiments, the present disclosure is directed to solution-processable superatomic thin-films which can be amorphous and/or homogenous. In certain embodiments, the superatomic solutions have tunable compositions and functions. For example, but not by the way of limitation, superatomic solutions can be produced by installing flexible side-chains on nanoscale clusters to reduce the crystal formation. Typically, superatomic ionic crystals are formed due to strong electronic interactions between the constituent clusters, and this can result in crystallization of ionic pairs. However, as shown in the present disclosure, such interactions can be frustrated, leading to solution-processable superatomic thin films that are amorphous.

In certain embodiments, the interaction of the constituent clusters can be frustrated by installation of flexible side-chains, which allows for dispersion of the charge over a large volume of space thus weakening electrostatic interactions and reducing crystallization of nanoscale clusters.

In certain embodiments, the superatomic thin-films are based on a metal-containing superatom and a fullerene derivative. The metal-containing superatom can be selected from the group consisting of metal chalcogenide clusters and metal clusters. For example, the metal chalcogenide clusters can include $Co_6Se_8(PR_1R_2R_3)_6$, $Co_6Te_8(PR_1R_2R_3)_6$, $Ni_9Te_6(PR_1R_2R_3)_8$, $Cr_6Se_8(PR_1R_2R_3)_6$, $Cr_6Te_8(PR_1R_2R_3)_6$, $Re_6Se_8(PR_1R_2R_3)_6$, $Re_6Te_8(PR_1R_2R_3)_6$, and/or derivatives thereof. The metal clusters can include $Au_2(SR)_{18}$, $Au_3(SR)_{24}$, and/or derivatives thereof. In non-limiting embodiments, the metal-containing superatom can be $Co_6Te_8(PR_1R_2R_3)_6$. In certain embodiments, $R_1$, $R_2$, and $R_3$ are independently $C_3$-$C_{20}$ straight or branched alkyl groups. In certain embodiments, $R_1$, $R_2$, and $R_3$ are independently $C_3$-$C_{15}$, $C_3$-$C_{10}$, $C_3$-$C_8$, or $C_3$-$C_5$ straight or branched alkyl groups.

In certain embodiments, $R_1=R_2=R_3$. In certain other embodiments, $R_1$ and $R_2$ are the same and $R_3$ is different. In certain other embodiments, each of $R_1$, $R_2$ and $R_3$ are different. In a particular embodiment, $R_1=R_2=R_3=$n-propyl.

In certain embodiments, the fullerene derivatives can be $C_{20}$, $C_{60}$, $C_{70}$, $C_{72}$, $C_{74}$, $C_{76}$, $C_{78}$, $C_{80}$, $C_{82}$, $C_{84}$, $C_{86}$, $C_{88}$, $C_{90}$, PCBM, C60-COOH, C70-COOH, pyrazolino[60]fullerene, methano[60]fullerene, isoxazolino[60]fullerene, [60]ThCBM, [60]PCB-C8, [60]PCB-C4, [70]PCBM, and/or derivatives thereof.

In certain embodiments, the superatomic thin-films are based on a metal chalcogenide cluster $Co_6Te_8(PPr_3)_6$, ("[Co]") (wherein $PPr_3$ is tri-n-propylphosphine), and a fullerene derivative [6,6]-phenyl-C61-butyric acid methyl ester with butyric acid methyl ester side-chains ("[PCBM]").

In certain embodiments, the molar ratio of the constituent clusters can be adjusted to control properties of the resulting thin films. For example, the ratio of [Co] and [PBCM] can be from about 1:1 to about 1:10. In certain embodiments, the ratio of [Co] and [PBCM] is about 1:2, about 1:3, about 1:4, about 1:5, about 1:7, or about 1:9.

In certain embodiments, the superatomic solution containing mixtures of [Co] and [PCBM] can be spin-coated into a thin-film on a substrate. The formation of a homogenous and amorphous thin-film can be verified via the scanning electron microscopy (SEM), energy dispersive X-ray spectroscopy (EDS), high resolution transmission electron microscopy, and/or atomic force microscopy (AFM).

FIGS. 1A, 2A, 3A, 4A, 5A and 6A provide SEM images of each of $[Co][PCBM]_x$ (x=2, 3, 4, 5, 7, 9) spun onto a silicon wafer. As shown in these Figures, the thin films are uniform. Additionally, as shown in FIGS. 1B, 2B, 3B, 4B, 5B and 6B, [Co] clusters are distributed uniformly throughout the thin films.

In certain embodiments, the materials disclosed herein are amorphous in nature. Such properties can be confirmed by high-resolution transmission electron microscopy (HRTEM) and selected-area electron diffraction (SAED) patterns. In certain embodiments, as illustrated in FIGS. 13-30, the thin films of $[Co][PCBM]_x$ (x=2, 3, 4, 5, 7, 9) remain completely amorphous with no crystalline domains or large nanostructure agglomerates identifiable in the HRTEM images and no diffraction spots or sharp Debye-Scherre diffraction rings observable in SAED patterns. Such amorphous and homogeneous nature of the superatomic films reveals that the electrostatic interactions between the ionic clusters are fully frustrated, which is in distinct contrast to the strong tendency to crystallize in atomic ionic solids or certain other superatomic crystals.

Figure 37:
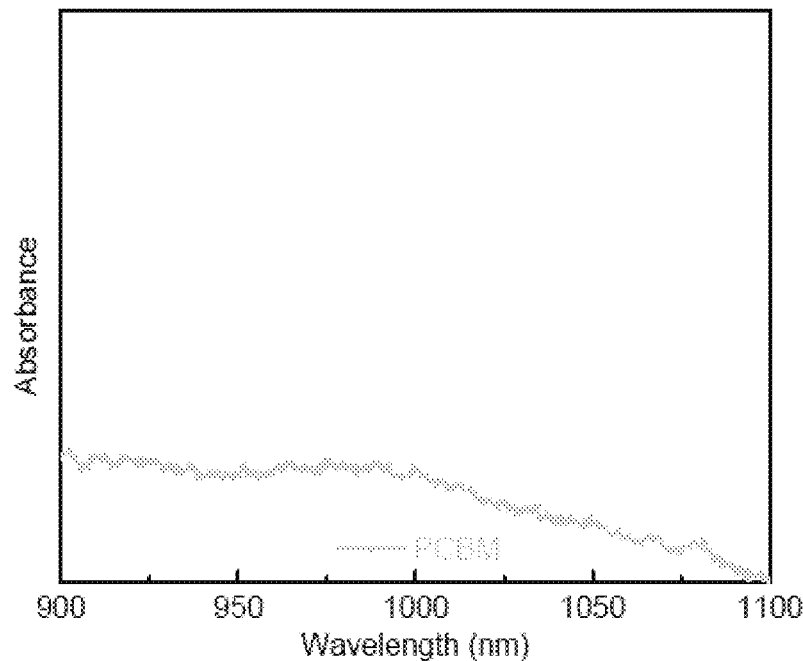
FIG. 37 provides an electronic absorption spectrum of drop casted pure PCBM on glass substrate.
Figure 38:
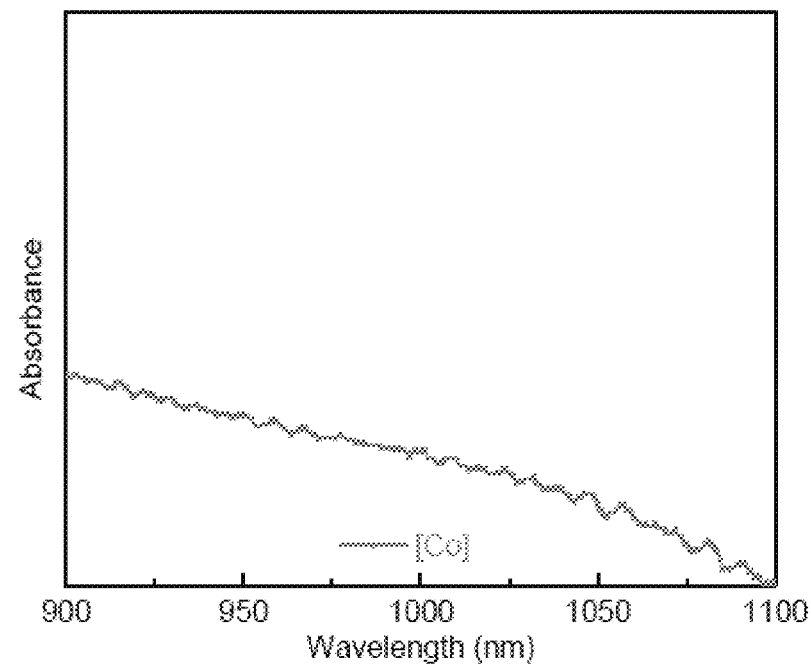
FIG. 38 provides an electronic absorption spectrum of drop casted [Co] on glass substrate.
Figure 39:
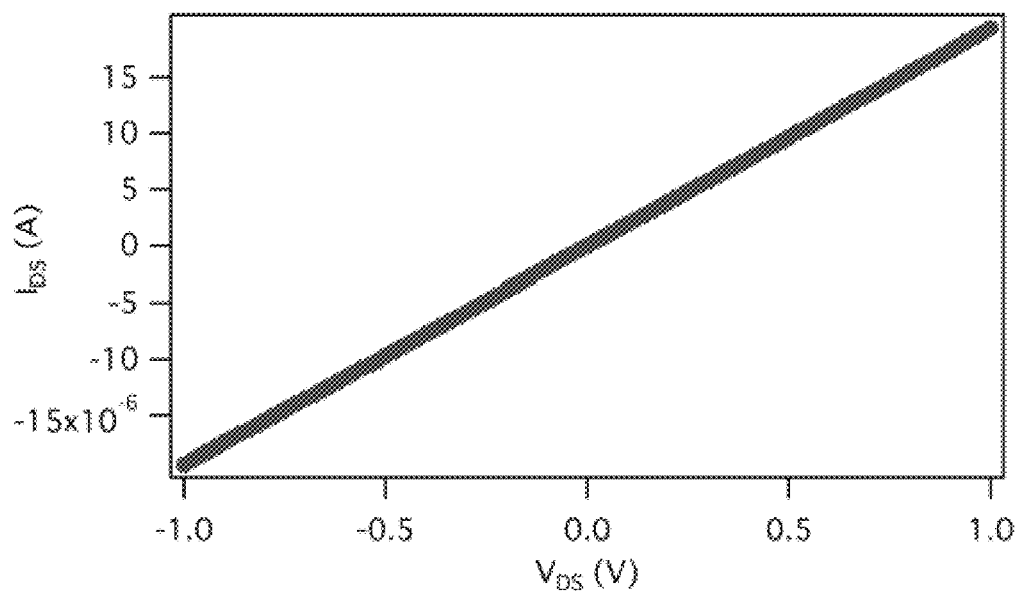
FIG. 39 provides a current-voltage curve of thin film [Co][PCBM]$_2$.
Figure 40:
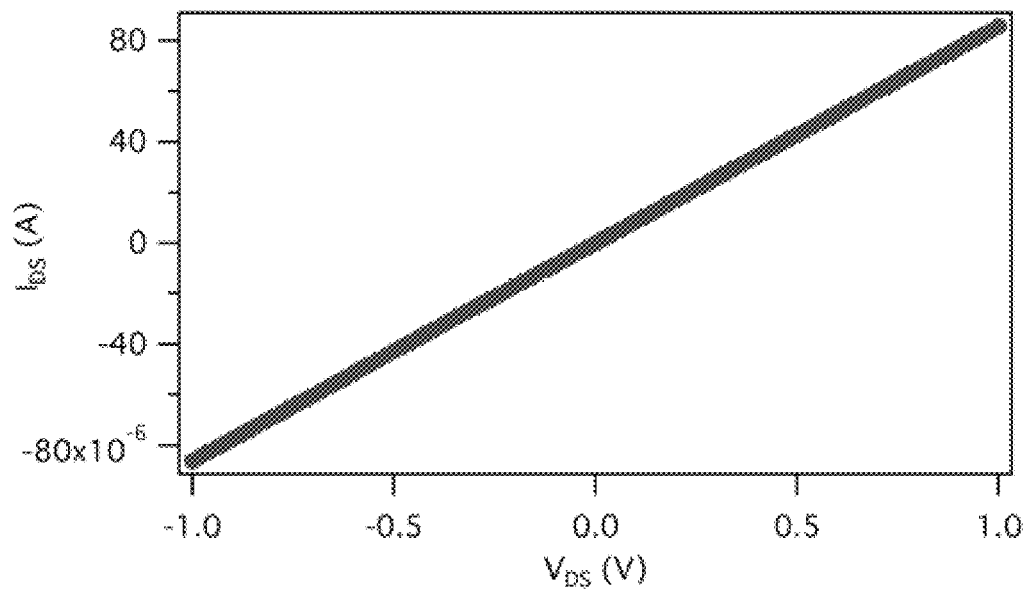
FIG. 40 provides a current-voltage curve of thin film [Co][PCBM]$_3$.
Figure 41:
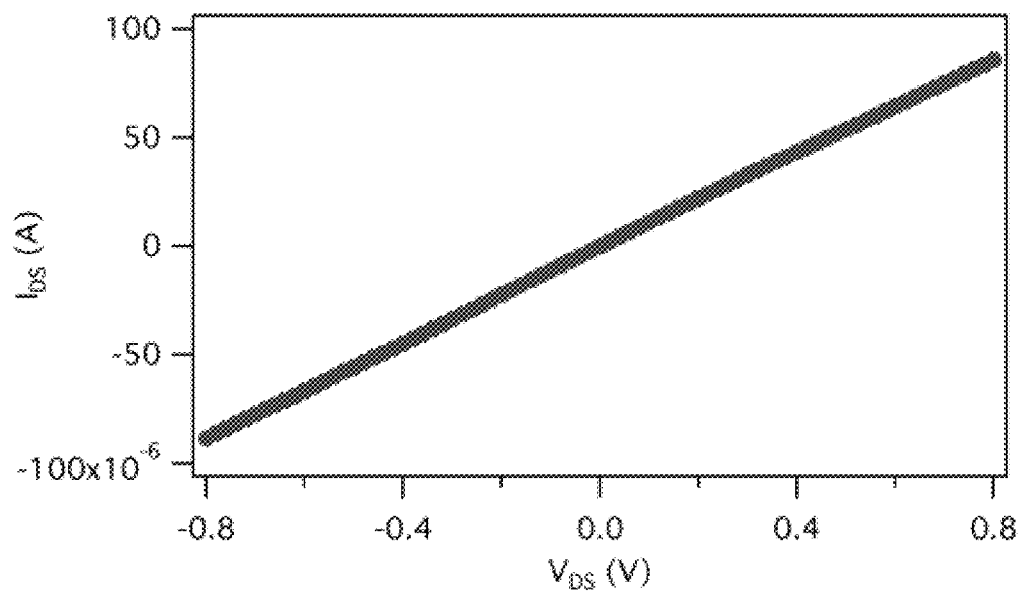
FIG. 41 provides a current-voltage curve of thin film [Co][PCBM]$_4$.
Figure 42:
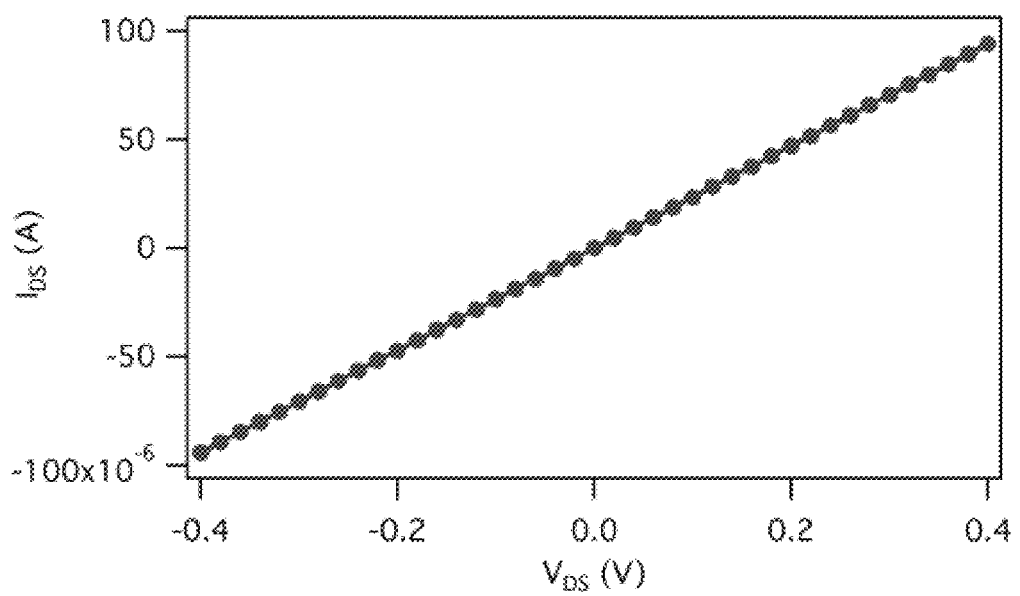
FIG. 42 provides a current-voltage curve of thin film [Co][PCBM]s.
Figure 43:
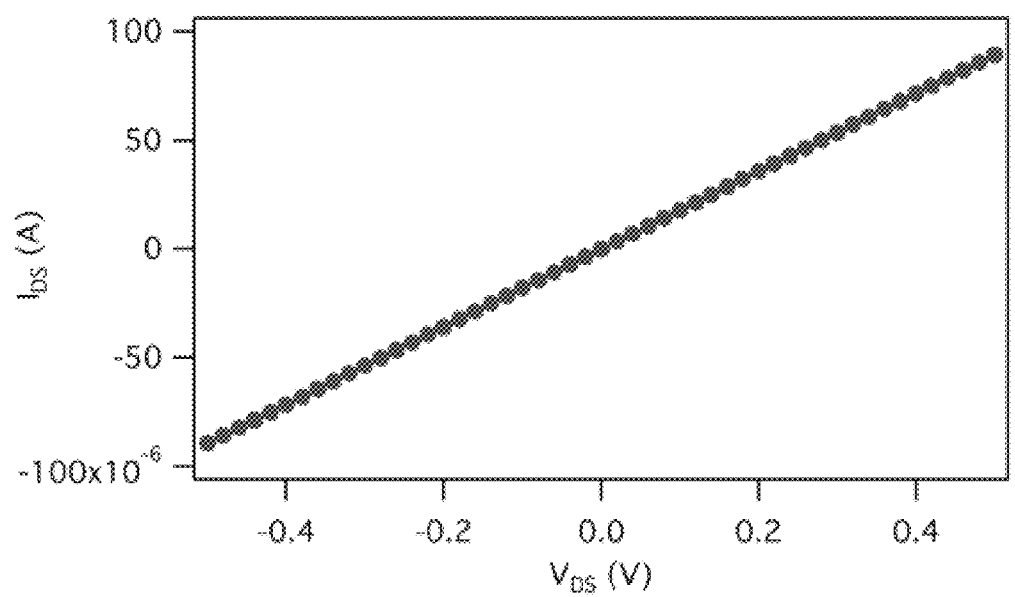
FIG. 43 provides a current-voltage curve of thin film [Co][PCBM]$_7$.
Figure 44:
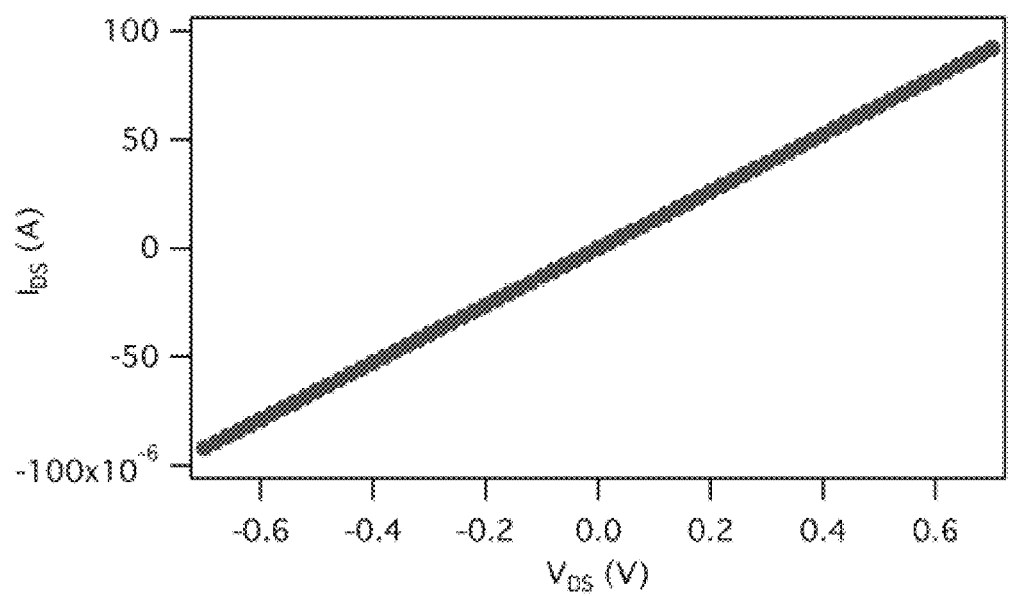
FIG. 44 provides a current-voltage curve of thin film [Co][PCBM]$_9$.
Figure 54:
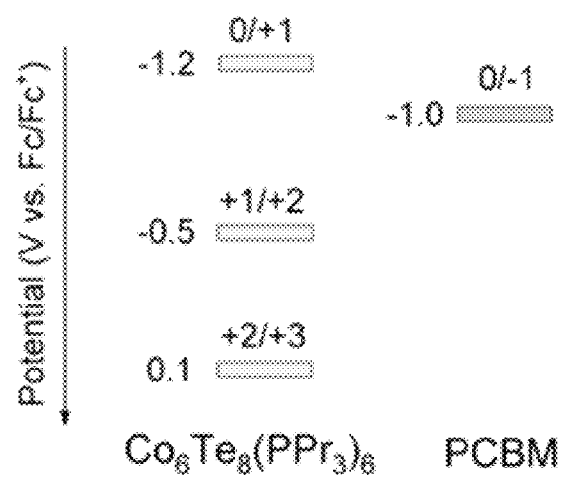
FIG. 54 provides redox potentials for isolated [Co] and [PCBM] clusters vs. Ferrocene/Ferrocenium couple.

In certain embodiments, the think films disclosed herein show electron transfer from [Co] to [PCBM], as evidenced by FIGS. 31-36. Particularly, absorption band between 1020-1025 nm, which is characteristic of [PCBM] radical anion, was observed for all six of $[Co][PCBM]_x$ (x=2, 3, 4, 5, 7, 9). However, as shown in FIGS. 37 and 38, neither [Co], nor [PCBM] have this feature on their own. This is consistent with the redox potentials of the individual clusters, as shown in FIG. 54.

Figure 55:
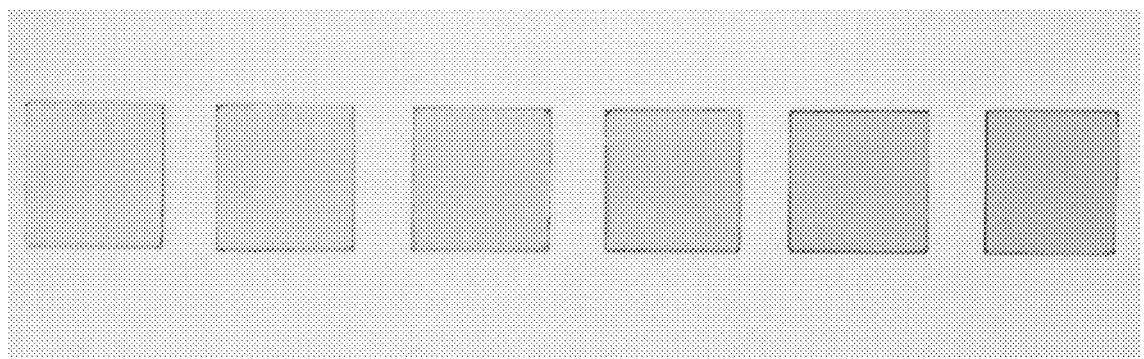
FIG. 55 provides optical image of superatomic films spin-coated on glass. From left to right are [Co][PCBM]x (x=2, 3, 4, 5, 7, 9), respectively.

In certain embodiments, the disclosed solution-processable superatomic thin-films can be transparent. In certain embodiments, the superatomic thin films disclosed herein are highly transparent in the visible range. By an example and not by the way of limitation, [Co][PCBM](x=2, 3, 4, 5, 7, 9) are all optically transparent, as shown in FIG. 55. The disclosed solution-processable superatomic thin-films can provide optical transparency up to 92% in the visible range.

Figure 56:
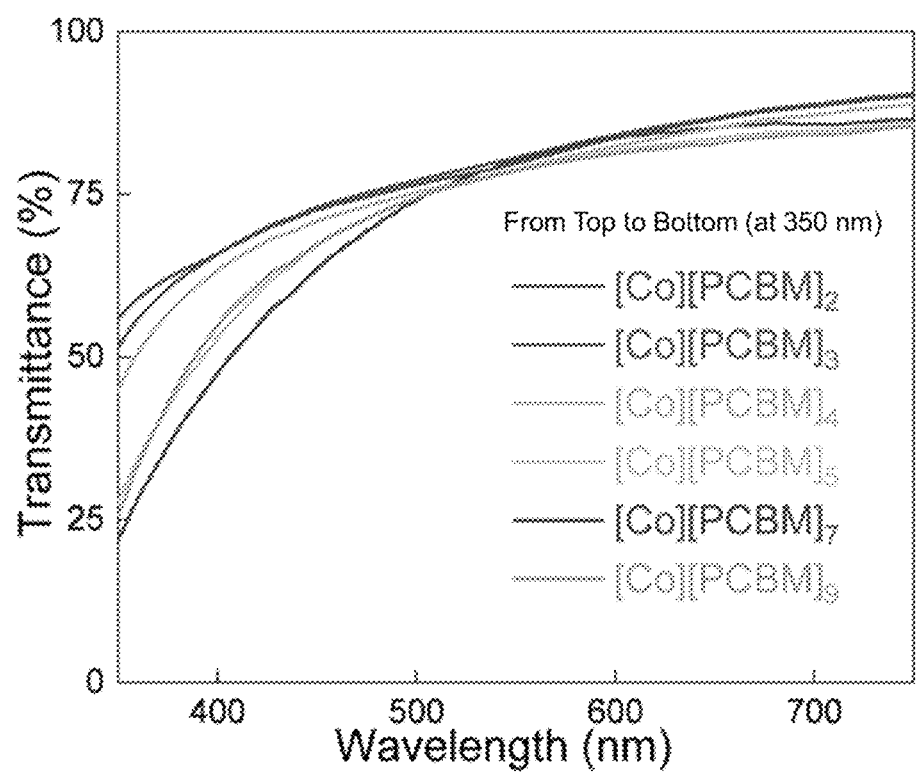
FIG. 56 provides transmittance spectra of superatomic thin films on glass substrates.

For example, the transmittance of the disclosed films at 550 nm can be about 80%. Transmittance of each of the six samples is shown in FIG. 56.

In certain embodiments, the disclosed solution-processable superatomic thin-films can provide improved electrical conductivities. For example, the disclosed solution-processable superatomic thin-films can have an electrical conductivity up to about 301 Siemens/m. The electrical conductivity of the thin-films can be modified by adjusting ratios of the constituent clusters. For example, improved conductivity of the disclosed thin-films can occur at a ratio of 5:1 (PCBM:Co) with up to 301 S/m. As the mixing ratio approaches pure PCBM or Co, conductivity can decrease and approach 0.

In certain embodiments, the disclosed solution-processable superatomic thin-films can provide improved thermal transport properties. For example, room-temperature thermal conductivities of the disclosed thin-films can be between about 0.05 $Wm^{-1}K^{-1}$ to about 0.07 $Wm^{-1}K^{-1}$. The thermal conductivity of the thin-films can be modified by adjusting ratios of the constituent clusters. For example, and not by the way of limitation, higher thermal conductivity could be obtained by using higher ratios of metal chalcogenide clusters in the mixture, and lower thermal conductivities could be obtained with higher ratios of the fullerene clusters.

In certain embodiments, the disclosed solution-processable superatomic thin-films can provide thermoelectric properties with unoptimized ZT values (i.e., figure-of-merit) of 0.02. Such value is higher than that of bulk silicon and an order of magnitude higher than those of many organic thermoelectric materials.

In certain embodiments, the disclosed subject matter can be applied to create various solution-processable and multifunctional cluster solids.

In certain embodiments, the films disclosed herein possess solution-processability, easy-intergratability, high electrical conductivity, ultra-low thermal conductivity, high thermoelectric merit, and high optical transparency.

In certain embodiments, the films disclosed herein can be used in preparation of transparent conducting films for smart phones and other touch-screen devices, thin-film thermoelectric devices, transparent thermal insulation coatings, material-integrated temperature sensors, printable electronics, wearable electronics, stretchable and flexible electronics, smart robotics systems.

EXAMPLES

The presently disclosed subject matter will be better understood by reference to the following Example, which is provided as exemplary of the presently disclosed subject matter, and not by way of limitation.

Example 1—Synthesis and Characterization of $[Co_6Te_8(PPr_3)_6][PCBM]_n$

Tripropylphosphine, tellurium powder, dicobalt octacarbonyl, PCBM, and anhydrous and deoxygenated toluene and chlorobenzene were obtained from commercial sources. All reactions and sample preparations were carried out under nitrogen atmosphere in a nitrogen-filled glove box or using standard Schlenk techniques.

$Co_6Te_8(PPr_3)_6$ clusters were prepared synthesized using previously published protocols.

$Co_6Te_8(PPr_3)_6$ and PCBM were dissolved in chlorobenzene. The rations of each of the components are shown in Table 1. Each of the solutions was then filtered using a 0.2 μL syringe filter and stored for 12 hours before use. The resulting solutions were dark reddish brown.

TABLE 1

| Superatomic solutions | | |
|---|---|---|
| Samples | Abbreviation | $Co_6Te_8(PPr_3)_6$/PCBM/ Chlorobenzene (mg/mg/mL) |
| $[Co_6Te_8(PPr_3)_6][PCBM]_2$ | $[Co][PCBM]_2$ | 14.3/11.4/1 |
| $[Co_6Te_8(PPr_3)_6][PCBM]_3$ | $[Co][PCBM]_3$ | 11.8/14.1/1 |
| $[Co_6Te_8(PPr_3)_6][PCBM]_4$ | $[Co][PCBM]_4$ | 10.0/16.0/1 |
| $[Co_6Te_8(PPr_3)_6][PCBM]_5$ | $[Co][PCBM]_5$ | 8.7/17.4/1 |
| $[Co_6Te_8(PPr_3)_6][PCBM]_7$ | $[Co][PCBM]_7$ | 6.9/19.3/1 |
| $[Co_6Te_8(PPr_3)_6][PCBM]_9$ | $[Co][PCBM]_9$ | 5.7/20.6/1 |

These solutions remained stable with no precipitation after four months. In contrast, combinations of clusters with shorter side-chains typically result in superatomic crystals within hours.

These solutions were used to prepare superatomic think films by dropping 50p onto a substrate and then spin coating them at 1000 rpm for 60 seconds. Optical images of these spin-coated thin films on silicon wafer were taken on a Nikon Eclipse LV150N optical microscope.

Each of the films was characterized by scanning electron microscopy (using a ZEISS Sigma FE-SEM), and energy-dispersive X-ray spectroscopy (using Bruker XFlash 6130 attachment).

AFM Characterization

Atomic force microscopy (AFM) was used to probe the thickness and surface roughness of the films. All thin films show similar thicknesses of ~100 nm under same spin-coat conditions, as illustrated in Table 2. This thickness corresponds to 48 layers of superatoms, if the height of a layer of [Co] and [PCBM] superatoms is assumed to be 1.8 nm and van der Waals contacts are assumed to be 0.3 nm. As additionally illustrated in Table 2, the rootmean-square (RMS) roughness of the films is on the order of 0.5 nm. Notably, this is even smaller than the size of a single superatom, indicating good smoothness and flatness of the surfaces. These results demonstrate that these materials have outstanding film-forming capabilities.

TABLE 2

| Thickness and RMS roughness of superatomic thin films spin-coated on silicon wafers | | |
|---|---|---|
| Samples | Thickness (nm) | RMS roughness (nm) |
| $[Co_6Te_8(PPr_3)_6][PCBM]_2$ | 100(5) | 0.529 |
| $[Co_6Te_8(PPr_3)_6][PCBM]_3$ | 96(6) | 0.710 |
| $[Co_6Te_8(PPr_3)_6][PCBM]_4$ | 102(1) | 0.529 |
| $[Co_6Te_8(PPr_3)_6][PCBM]_5$ | 109(1) | 0.506 |
| $[Co_6Te_8(PPr_3)_6][PCBM]_7$ | 99(4) | 0.483 |
| $[Co_6Te_8(PPr_3)_6][PCBM]_9$ | 98(6) | 0.466 |

TEM Characterization and Electron Diffraction Pattern

Figure 13:
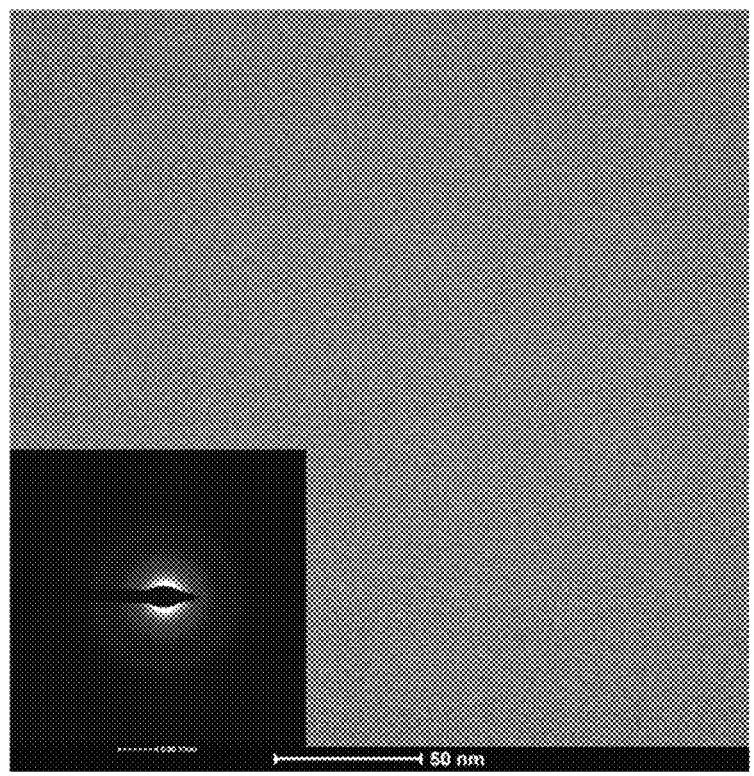
FIG. 13 provides an HR-TEM image and DP of an empty TEM grid with amorphous carbon film, which shows two main broad peaks (rings) that are located at ~0.21 nm (inner) and ~0.12 nm (outer).
Figure 14:
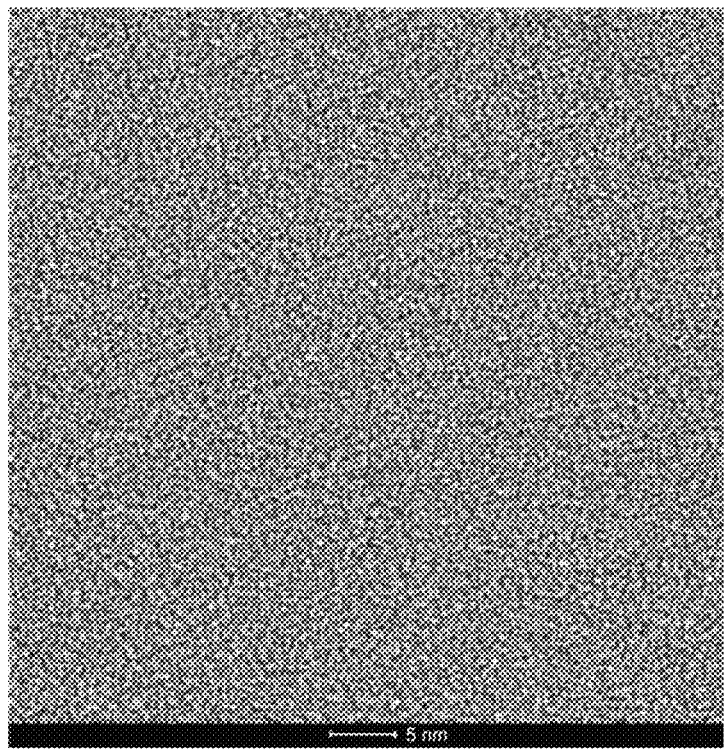
FIG. 14 provides a zoomed-in HR-TEM image of an empty TEM grid with amorphous carbon film.
Figure 15:
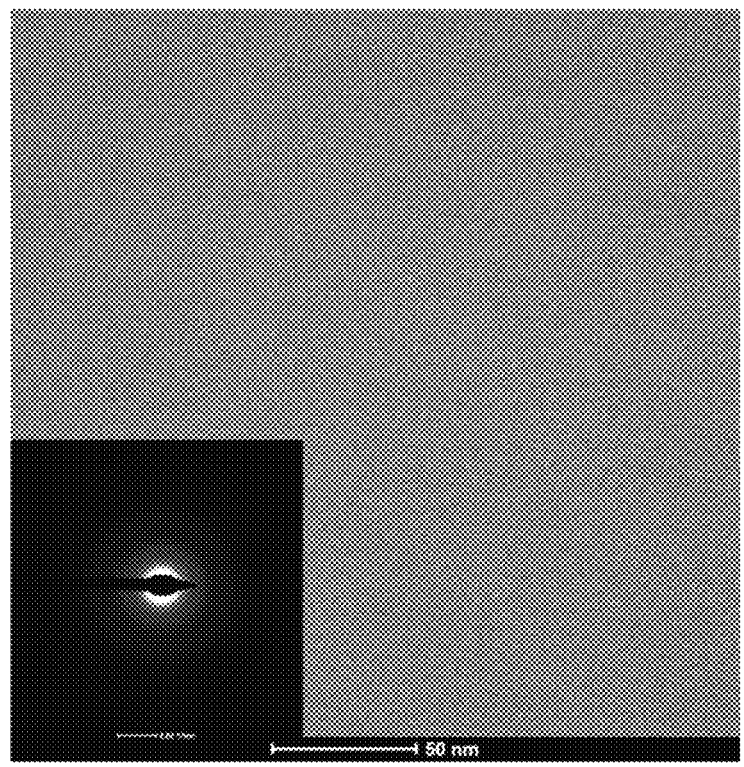
FIG. 15 provides an HR-TEM image and DP of PCBM film, which shows two main broad peaks (rings) that are located at ~0.21 nm (inner) and ~0.12 nm (outer).
Figure 16:
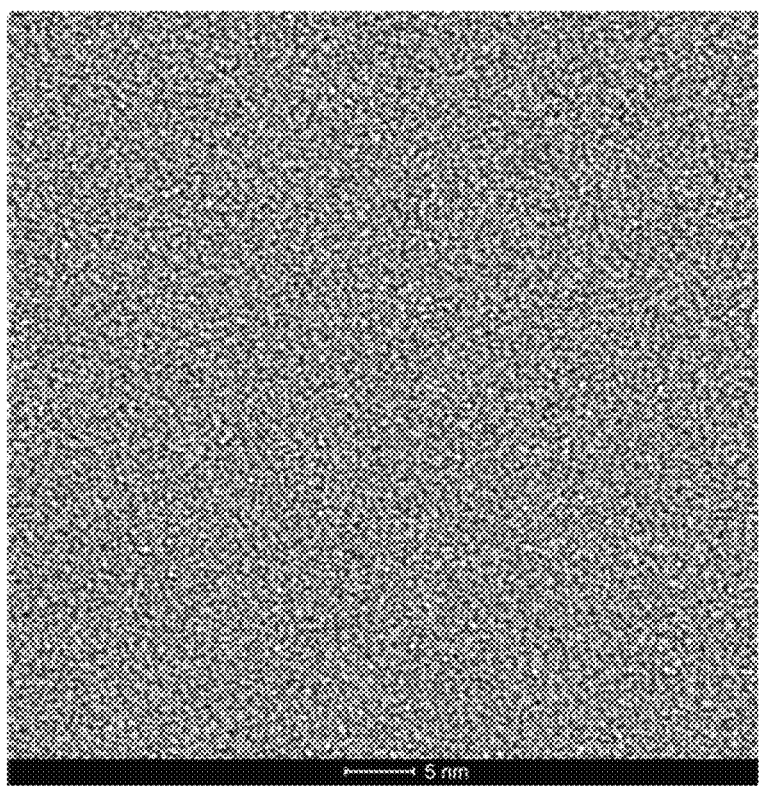
FIG. 16 provides a zoomed-in HR-TEM image of PCBM film.
Figure 17:
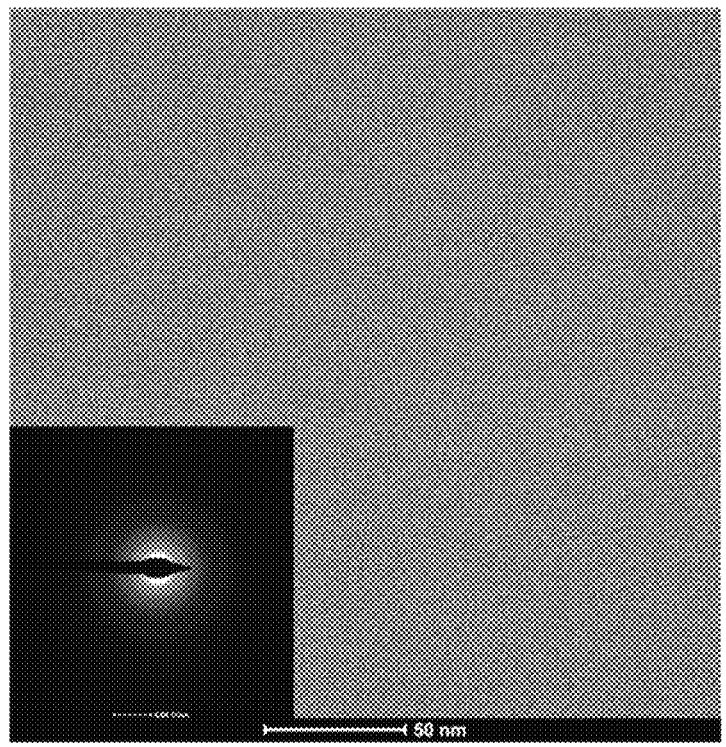
FIG. 17 provides an HR-TEM image and DP of pure [Co], which shows three main broad peaks (rings) that are located at ~0.30 nm (inner), 0.21 nm (middle) and ~0.12 nm (outer).
Figure 18:
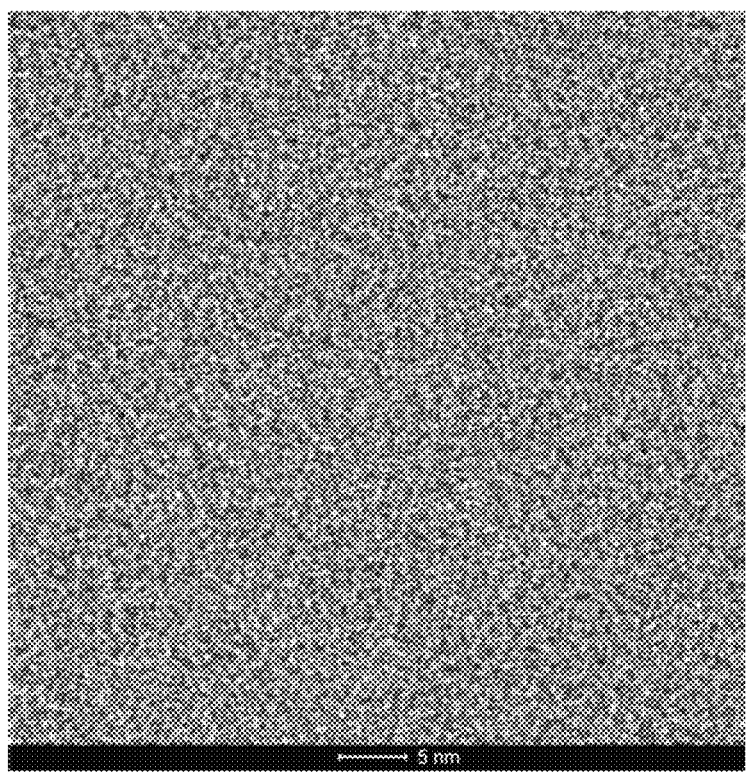
FIG. 18 provides a zoomed-in HR-TEM image of pure [Co] spin-coated on a TEM grid.
Figure 19:
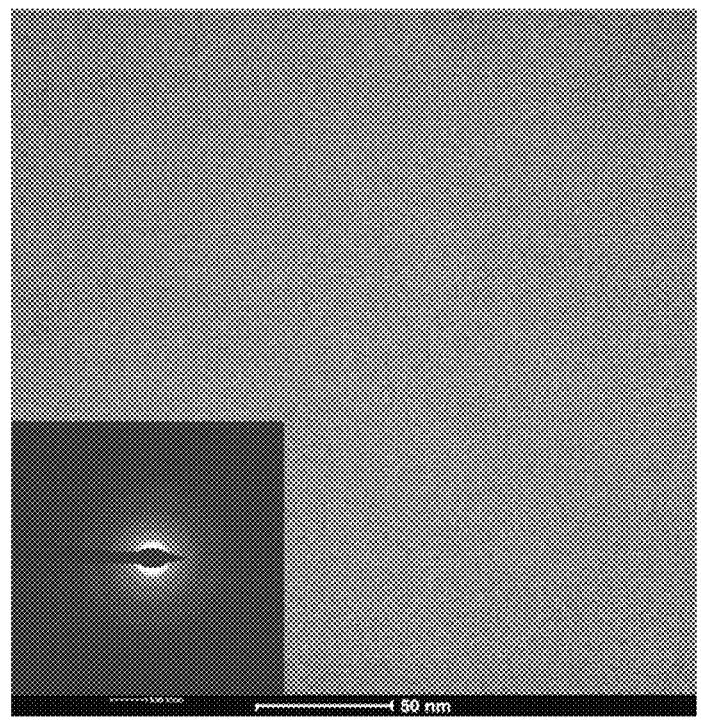
FIG. 19 provides an HR-TEM image and DP of [Co][PCBM]$_2$, which shows three main broad peaks (rings) that are located at ~0.30 nm (inner), 0.21 nm (middle) and ~0.12 nm (outer).
Figure 20:
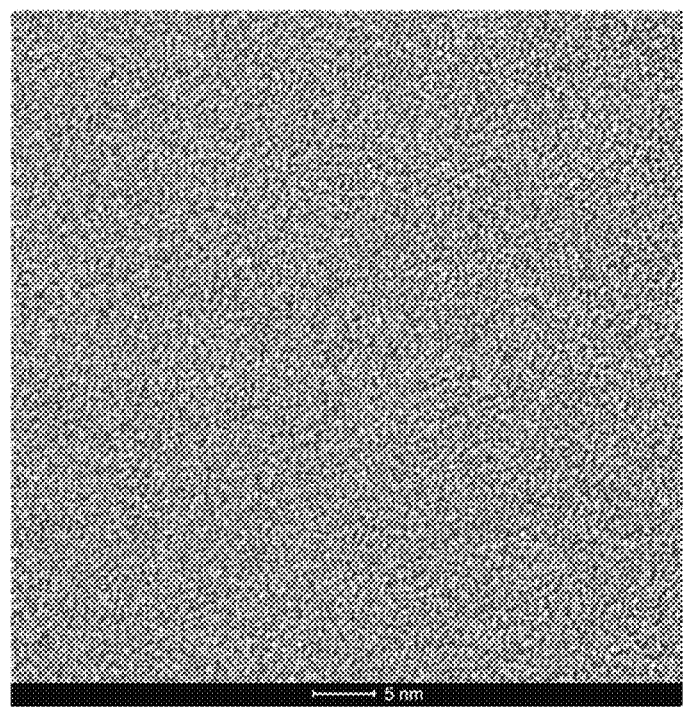
FIG. 20 provides a zoomed-in HR-TEM image of [Co][PCBM]$_2$ spin-coated on a TEM grid.
Figure 21:
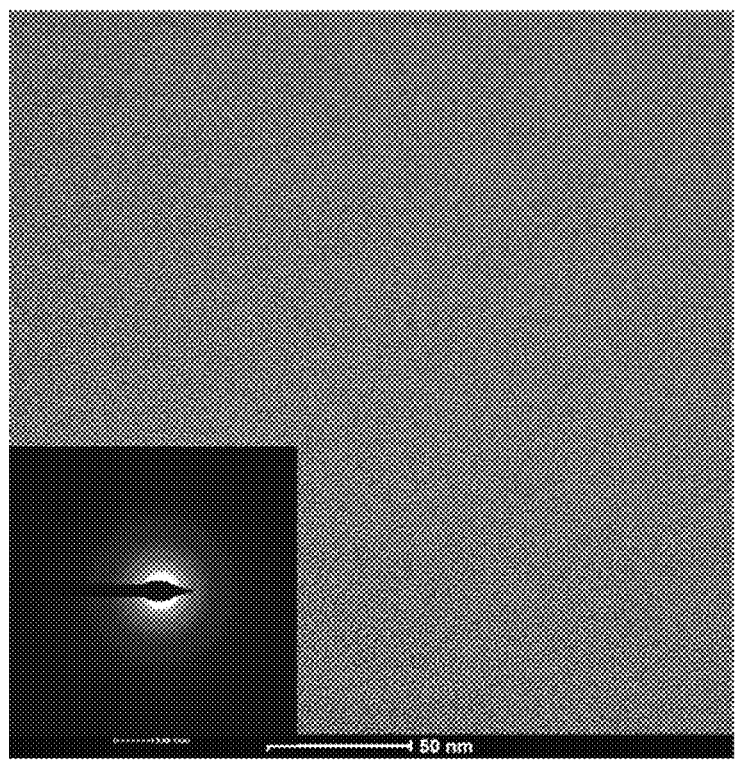
FIG. 21 provides an HR-TEM image and DP of [Co][PCBM]$_3$, which shows three main broad peaks (rings) that are located at ~0.30 nm (inner), 0.21 nm (middle) and ~0.12 nm (outer).
Figure 22:
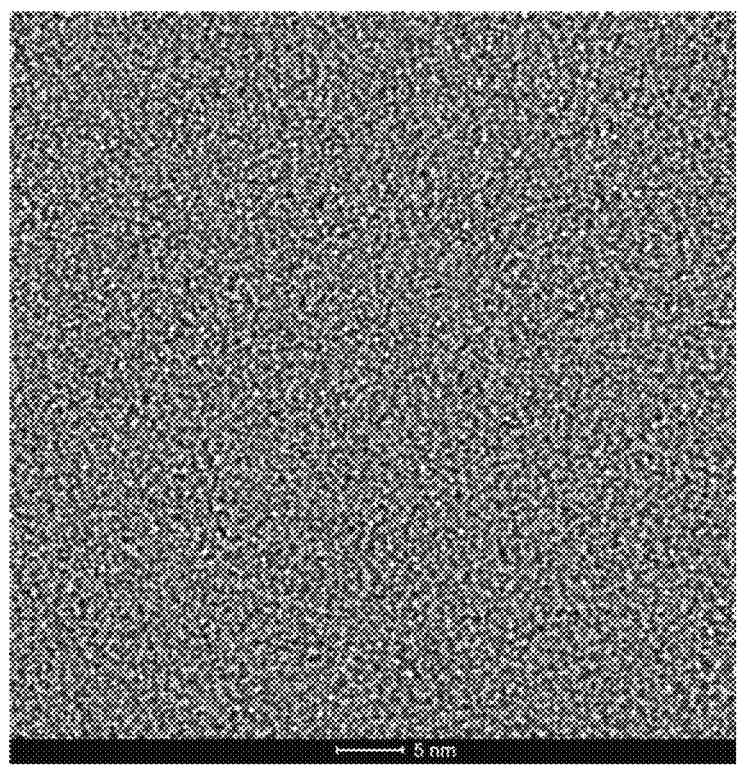
FIG. 22 provides a zoomed-in HR-TEM image of [Co][PCBM]$_3$ spin-coated on a TEM grid.
Figure 23:
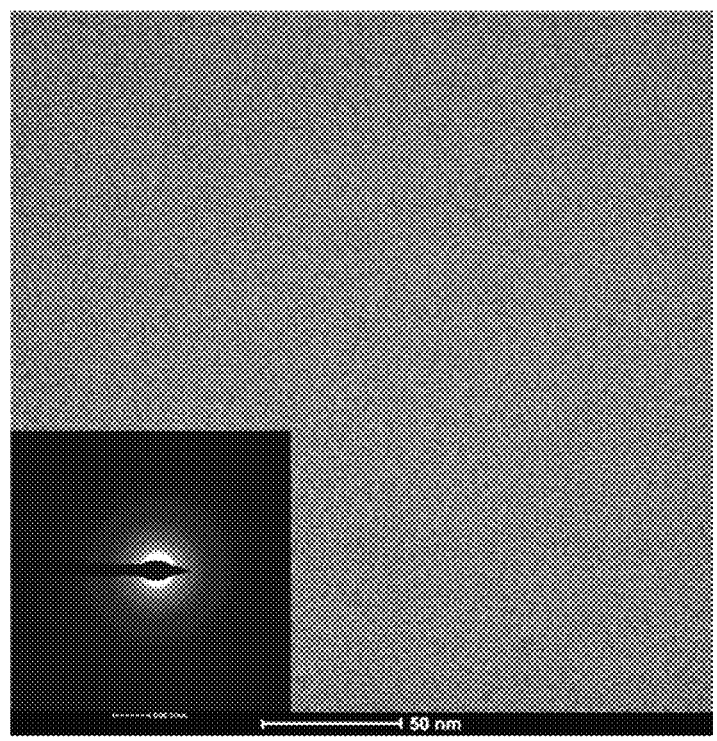
FIG. 23 provides an HR-TEM image and DP of [Co][PCBM]$_4$, which shows three main broad peaks (rings) that are located at ~0.30 nm (inner), 0.21 nm (middle) and ~0.12 nm (outer).
Figure 24:
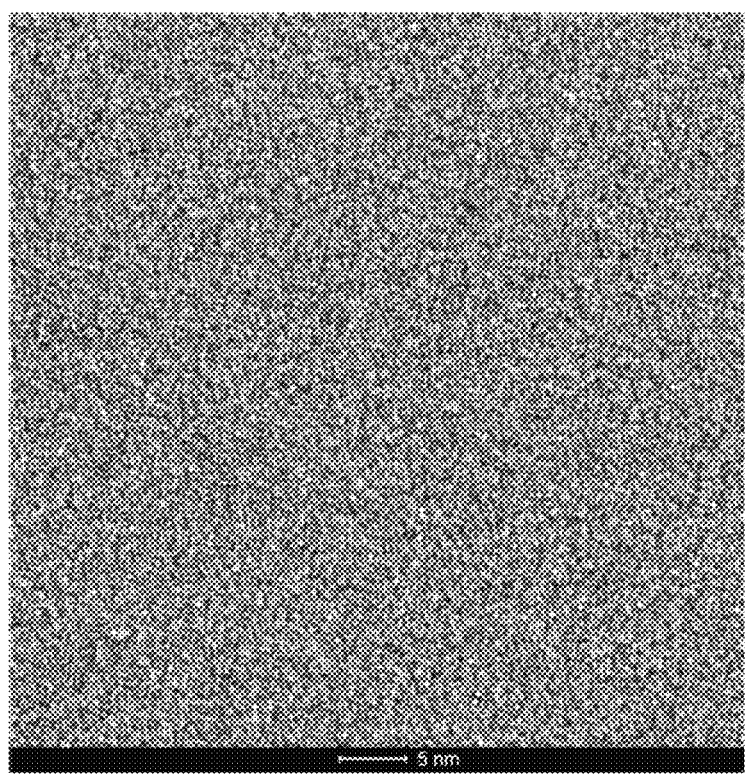
FIG. 24 provides a zoomed-in HR-TEM image of [Co][PCBM]$_4$ spin-coated on a TEM grid.
Figure 25:
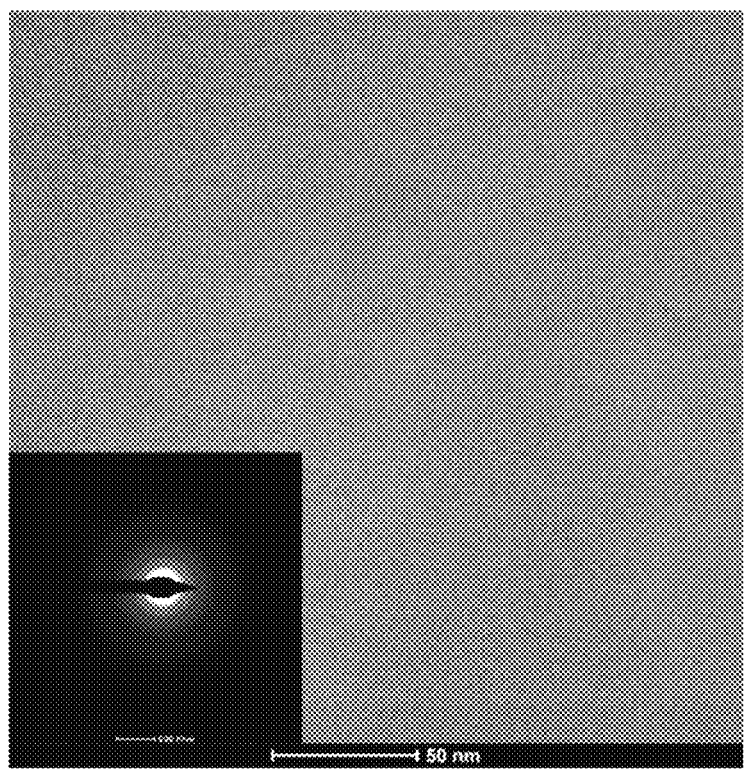
FIG. 25 provides an HR-TEM image and DP of [Co][PCBM]s, which shows three main broad peaks (rings) that are located at ~0.30 nm (inner), 0.21 nm (middle) and ~0.12 nm (outer).
Figure 26:
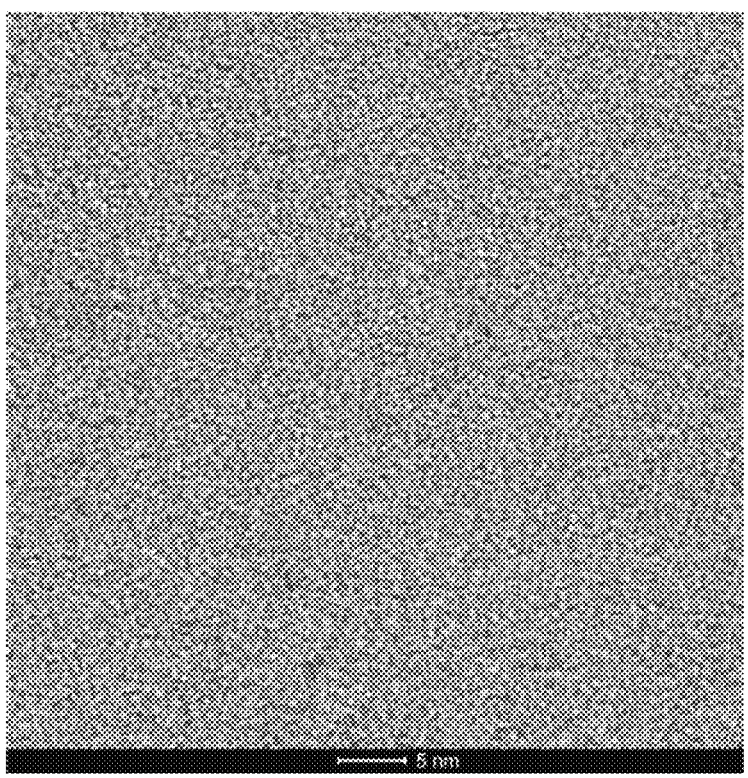
FIG. 26 provides a zoomed-in HR-TEM image of [Co][PCBM]$_5$ spin-coated on a TEM grid.
Figure 27:
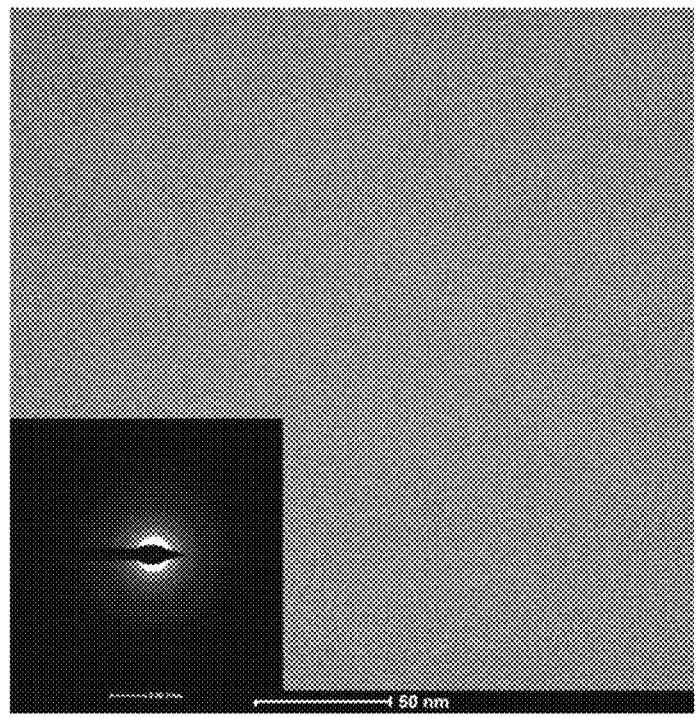
FIG. 27 provides an HR-TEM image and DP of [Co][PCBM]$_7$, which shows three main broad peaks (rings) that are located at ~0.30 nm (inner), 0.21 nm (middle) and ~0.12 nm (outer).
Figure 28:
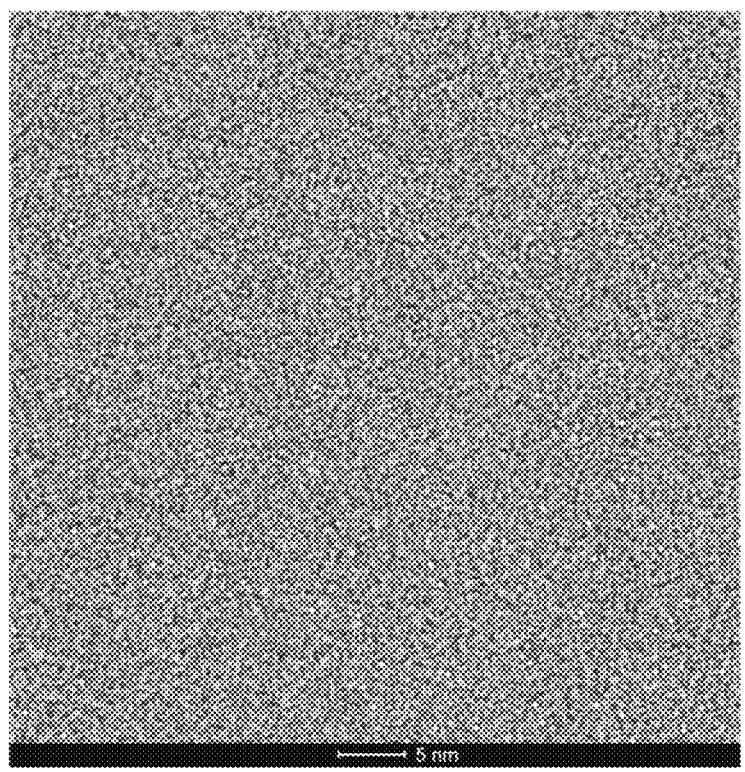
FIG. 28 provides a zoomed-in HR-TEM image of [Co][PCBM]$_7$ spin-coated on a TEM grid.
Figure 29:
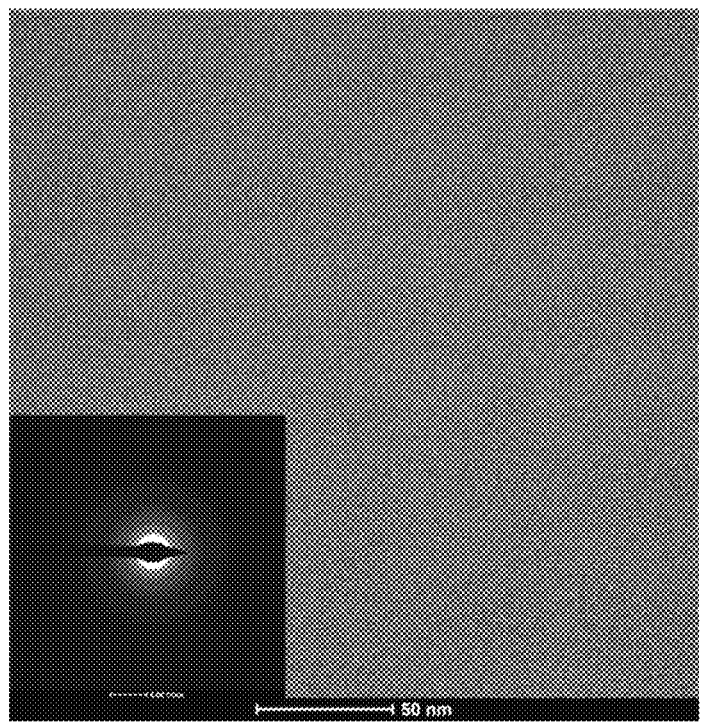
FIG. 29 provides an HR-TEM image and DP of [Co][PCBM]$_9$, which shows three main broad peaks (rings) that are located at ~0.30 nm (inner), 0.21 nm (middle) and ~0.12 nm (outer).
Figure 30:
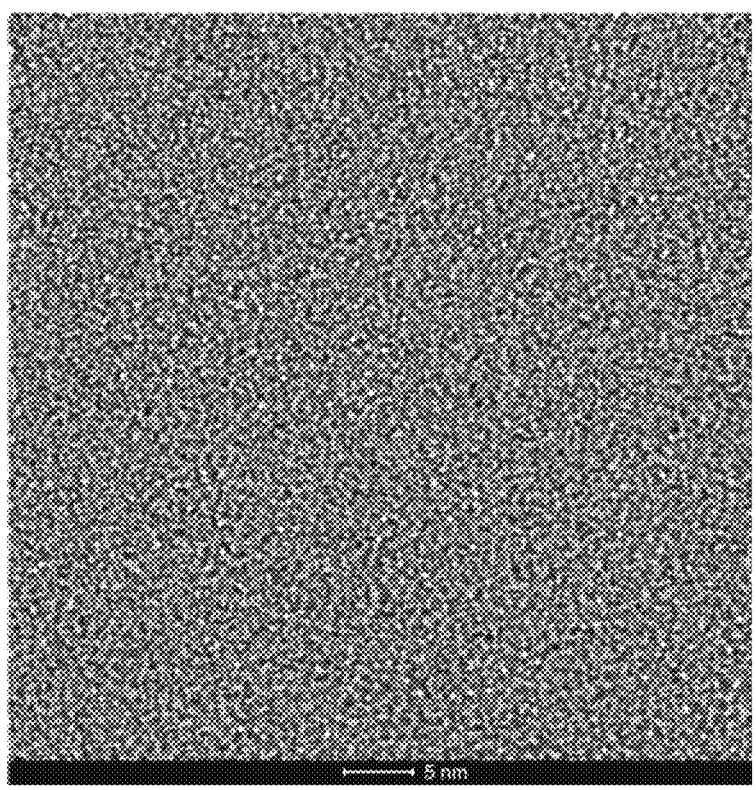
FIG. 30 provides a zoomed-in HR-TEM image of [Co][PCBM]$_9$ spin-coated on a TEM grid.
Figure 31:
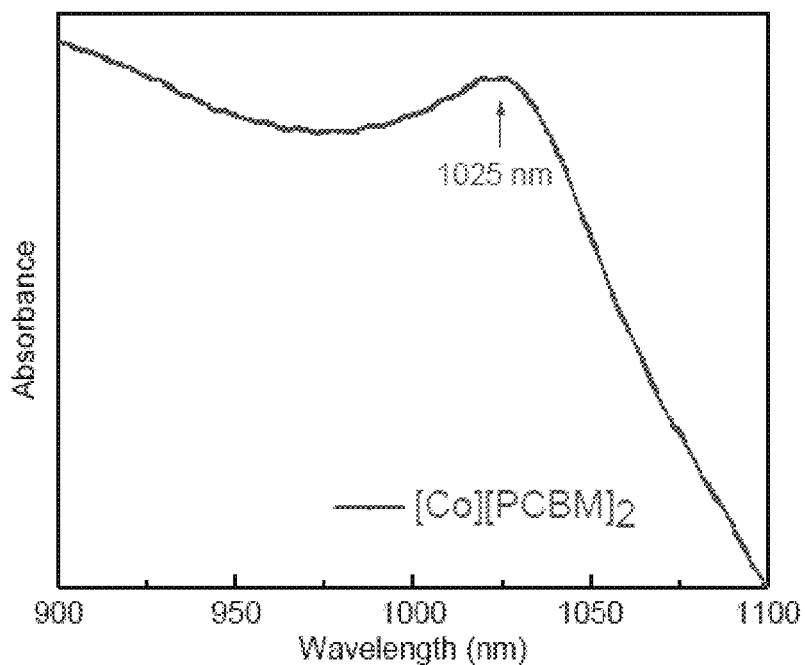
FIG. 31 provides an electronic absorption spectrum of [Co][PCBM]$_2$.
Figure 32:
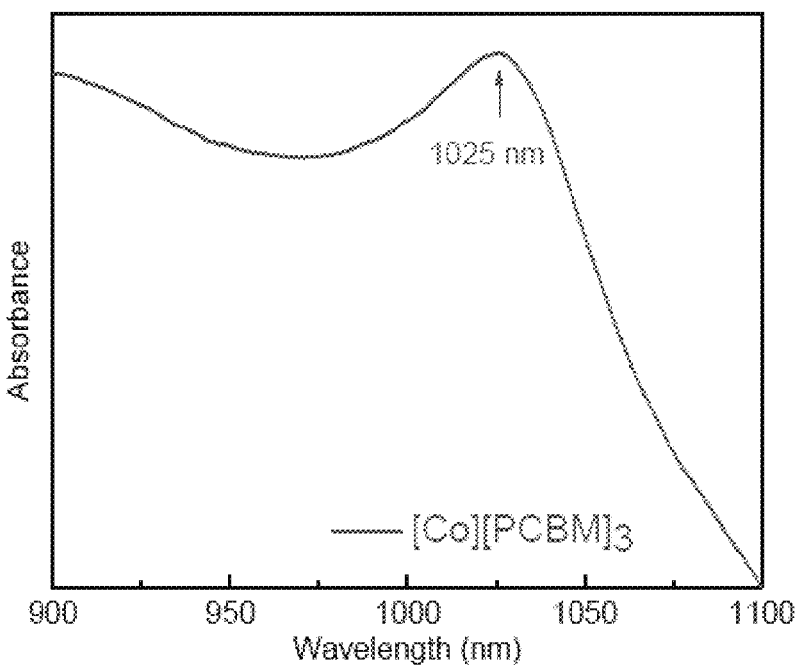
FIG. 32 provides an electronic absorption spectrum of [Co][PCBM]$_3$.
Figure 33:
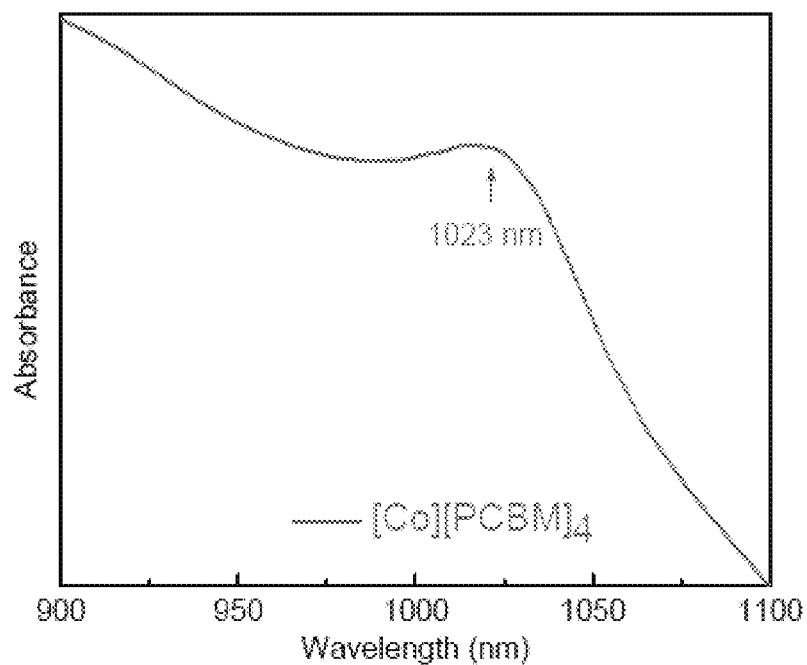
FIG. 33 provides an electronic absorption spectrum of [Co][PCBM]$_4$.
Figure 34:
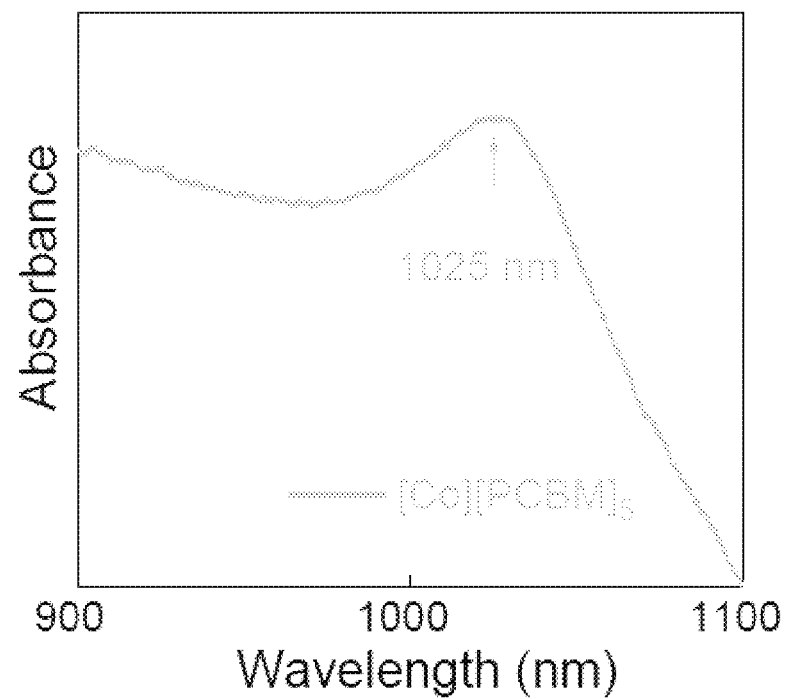
FIG. 34 provides an electronic absorption spectrum of [Co][PCBM]s.
Figure 35:
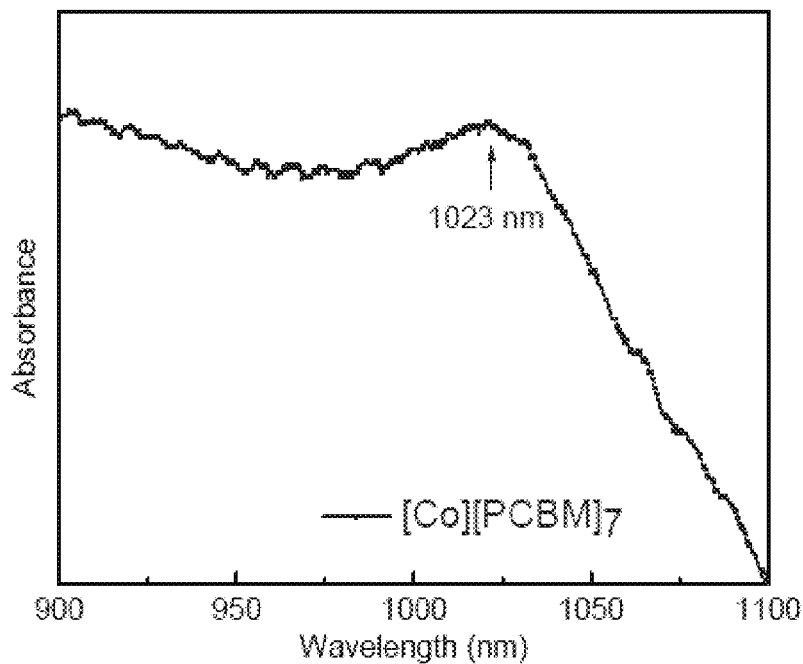
FIG. 35 provides an electronic absorption spectrum of [Co][PCBM]$_7$.
Figure 36:
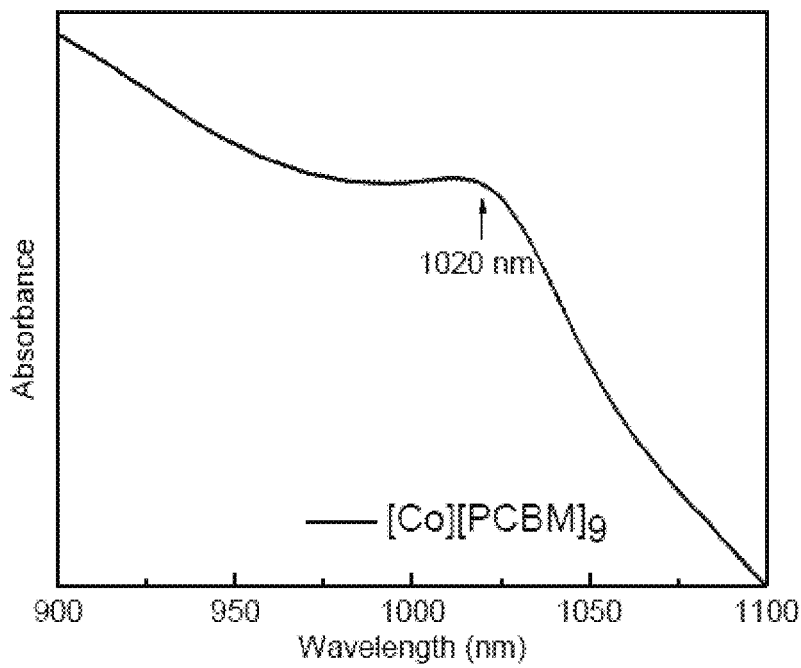
FIG. 36 provides an electronic absorption spectrum of [Co][PCBM]$_9$.

The materials were further studied by transmission electron microscopy (TEM), by using FEI Talos F200X working at an accelerating voltage of 200 kV. Objective aperture 70 μm, which includes the signal from 0.500 nm or larger plane spacings was used to remove high frequency noises and obtain high resolution images. Electron beam spot-size was set to 3 to achieve enough signal during imaging mode and diffraction mode. All diffraction patterns (DPs) from the samples and the empty carbon film grids were recorded at a camera length of 660 mm. The carbon film deposited on the TEM grid was observed to have an amorphous structure with a slight short-range crystallinity as indicated by the two main broad rings that are centered at ~0.21 nm and ~0.12 nm in the diffraction pattern, as illustrated in FIG. 13. Such diffraction patter is similar to that of the diamond-type amorphous carbon. This fact was taken into account and the information from the sample was measured accordingly. There is a broad ring centered at 0.30 nm (0.26-0.34 nm) in superatomic films and pure [Co] films, and is corresponding to the soup of atomic distances between heavy atoms within [Co] clusters (Co—Co: 0.30-0.33 nm, Te—Te: 0.33-0.36 nm, Co—Te: 0.25 nm).

Electronic Absorption

Electronic absorption spectra were taken on a Shimadzu UV-1800 spectrophotometer. thick drop-casted films on transparent glasses were used to record the electronic absorption spectrum, as spin-coated thin films have weak absorption. The Absorbance spectra are shown in FIGS. 31-36, and the results are summarized in Table 3.

TABLE 3

Electronic Absorption Spectra

| Samples | Peak Absorbance |
|---|---|
| $[Co_6Te_8(PPr_3)_6][PCBM]_2$ | 1025 |
| $[Co_6Te_8(PPr_3)_6][PCBM]_3$ | 1025 |
| $[Co_6Te_8(PPr_3)_6][PCBM]_4$ | 1023 |
| $[Co_6Te_8(PPr_3)_6][PCBM]_5$ | 1025 |
| $[Co_6Te_8(PPr_3)_6][PCBM]_7$ | 1023 |
| $[Co_6Te_8(PPr_3)_6][PCBM]_9$ | 1020 |

Room Temperature Electrical Conductivity

Room temperature electrical conductivity measurements were tested on the Agilent 4155C semiconductor parameter analyzer in a $N_2$ protected glove box. A voltage sweep from −1 to 1 V was applied and the current was measured to obtain current-voltage (I-V) curves. To create the devices, Au was deposited onto the substrate as bottom-contact source and drain electrodes (40 nm) with a width of 115 μm and length of 10 μm. Next, superatomic thin films were spin-casted on a silicon wafer (surface covered with 200 nm $SiO_2$ for insulation) at 1,000 r.p.m. for 60 s, to form the device. Current-voltage curves are shown in FIGS. 39-44 and electrical conductivities of the thin-films are shown in Table 4.

TABLE 4

Room temperature electrical conductivities

| Samples | Test 1 (S/m) | Test 2 (S/m) | Test 3 (S/m) | Test 4 (S/m) | Test 5 (S/m) | Average conductivity (S/m) |
|---|---|---|---|---|---|---|
| $[Co][PCBM]_2$ | 19 | 19 | 20 | 19 | 20 | 19(1) |
| $[Co][PCBM]_3$ | 82 | 86 | 85 | 88 | 70 | 82(6) |
| $[Co][PCBM]_4$ | 104 | 111 | 114 | 119 | 116 | 113(5) |
| $[Co][PCBM]_5$ | 309 | 296 | 296 | 309 | 296 | 301(6) |
| $[Co][PCBM]_7$ | 170 | 164 | 183 | 164 | 177 | 172(7) |
| $[Co][PCBM]_9$ | 122 | 145 | 140 | 136 | 102 | 129(15) |
| [Co] | 0 | 0 | 0 | 0 | 0 | 0 |
| [PCBM] | 0 | 0 | 0 | 0 | 0 | 0 |

Temperature Dependent Electrical Conductance

Temperature dependent electrical conductance measurements were realized in a vacuum cryogenic probe station (Lakeshore TTP4), with 25 μm-tip beryllium-copper probes for the drain and source connections. Computer-controlled source units were used to apply DC potentials (Yokogawa 7651 for source-drain bias). Current measurements were acquired using a current preamplifier (Stanford Research System SR570) and a digital multimeter (Keysight 34401A).

Figure 45A:
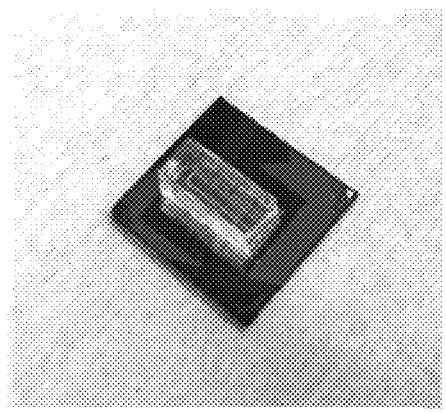
FIGS. 45A and 45B provide PDMS mold sealed superatomic thin film device used in temperature dependent electrical conductance measurements.
Figure 45B:
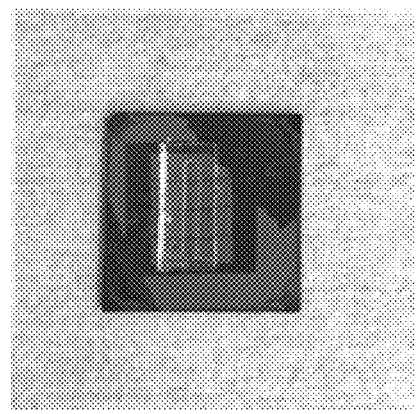

The superatomic thin film devices were prepared by spin-coating the mixture solutions on degenerately doped silicon substrates with a 285 nm thermal silicon oxide layer with prepatterned gold electrodes. The sample was then sealed within a PDMS mold in a $N_2$ protected glove box and transferred to the vacuum cryogenic probe station to prevent oxidation. PDMS mold sealed superatomic thin film device is shown in FIGS. 45A and 45B. A voltage sweeping from 0.4 to −0.4 V at a rate of 20 mV/s was applied and the current was measured to obtain current-voltage (I-V) curves. The temperature varied between 298 and 110 K using a built-in heater, liquid $N_2$ and a temperature controller.

Figure 46:
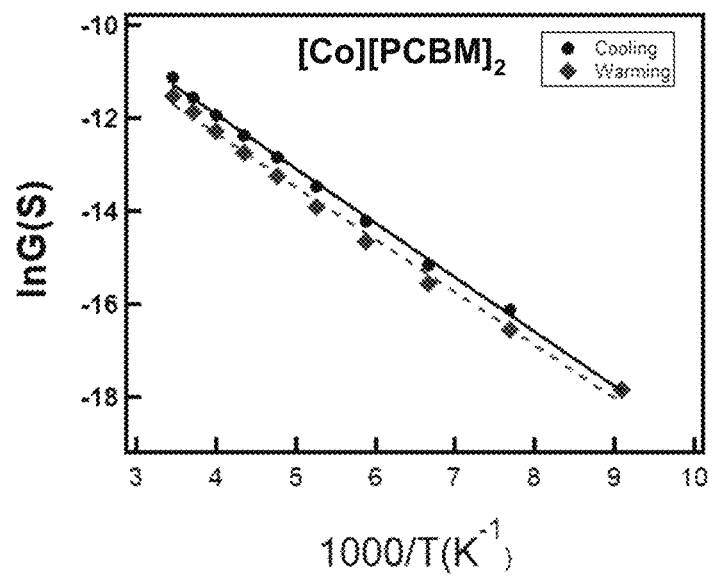
FIG. 46 provides a plot of the conductance (G) vs. 1/T for [Co][PCBM]$_2$.
Figure 47:
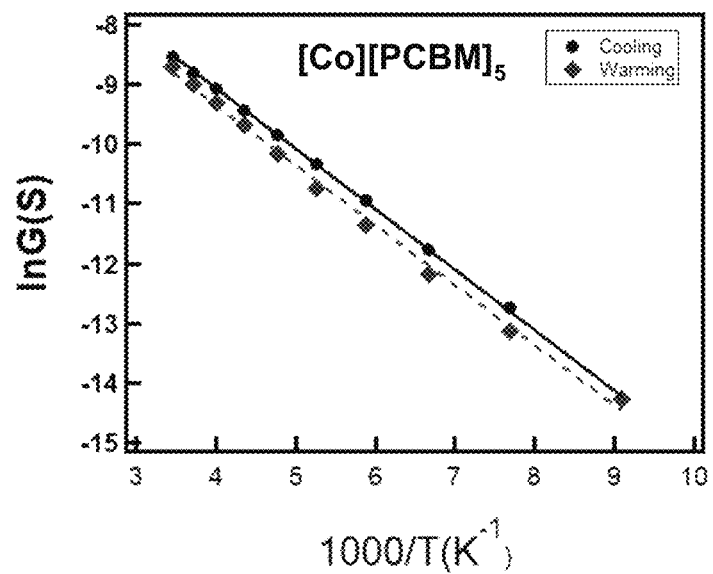
FIG. 47 provides a plot of the conductance (G) vs. 1/T for [Co][PCBM]s.
Figure 48:
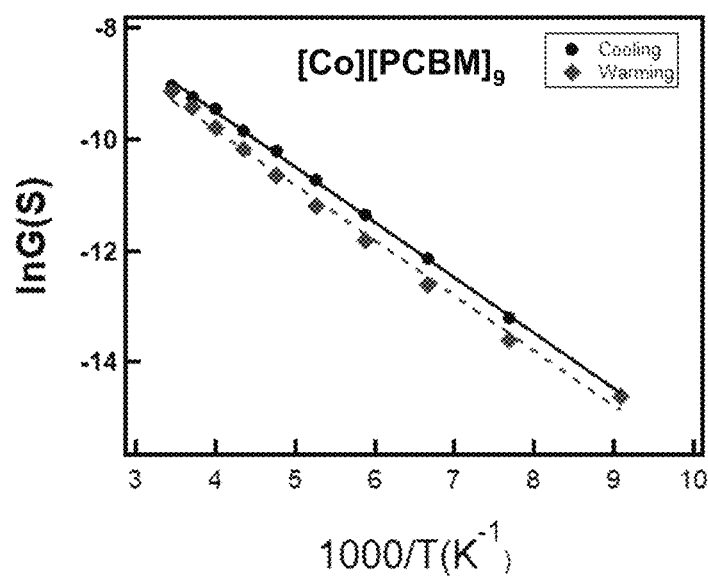
FIG. 48 provides a plot of the conductance (G) vs. 1/T for [Co][PCBM]$_9$.

A linear fitting was first applied to the I-V curves to extract the conductance values. The thermal activation energies ($[Co][PCBM]_2$, $[Co][PCBM]_5$, $[Co][PCBM]_9$) were then calculated from the slope of the Arrhenius plot (InG vs 1/T) indicated by the linear fitting. The conductance plots of the conductance (G) vs. 1/T for each of the three superatomic thin film devices are shown in FIGS. 46-48. The thermal activation energy for $[Co][PCBM]_2$ was found to be 101±2 meV calculated from the cooling trendline and 983 meV calculated from the warming trendline. The thermal activation energy for $[Co][PCBM]_5$ was found to be 871 meV calculated from the cooling trendline and 87±2 meV calculated from the warming trendline. The thermal activation energy for $[Co][PCBM]_9$ was found to be 861 meV calculated from the cooling trendline and 85±2 meV calculated from the warming trendline.

Thermal Conductivity

Figure 49:
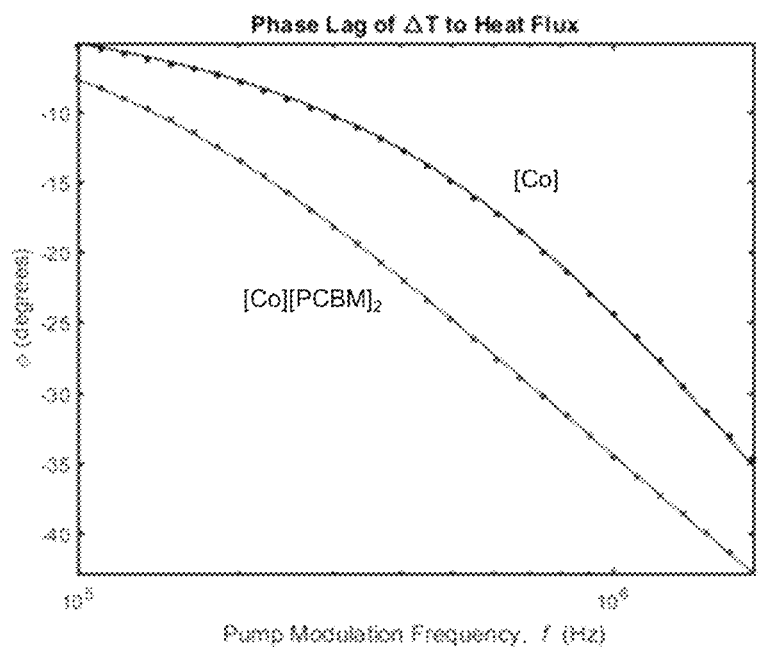
FIG. 49 provides a phase lag for pure [Co] and [Co][PCBM]$_2$.

Frequency domain thermoreflectance is a non-contact optical method in which a sample is heated by a periodically modulated (100 kHz-2 MHz) continuous-wave pump laser ($\lambda$=488 nm), while being simultaneously sampled by a coincident continuous-wave probe laser ($\lambda$=532 nm)4. The pump heating caused a periodic change in reflectivity due to the thermoreflectance of the Au/Al transducer deposited atop the $[Co][PCBM]_n$ films. Au was chosen for its thermoreflectance at the probe wavelength and Al was chosen for its low transmissivity at both wavelengths. The thermal conductivity of the sample is quantified by the phase lag between the reflected pump and probe beams which resulted from the thermoreflectance. The phase lag, a function of the modulation frequency, was fit to a solution of the heat equation for a layered, semi-infinite system to extract the $[Co][PCBM]_n$ films' thermal conductivities. A sample phase lag is shown in FIG. 49 for both pure [Co] and $[Co][PCBM]_2$, indicating our sensitivity to their difference thermal conductivities. The phase difference, φ, between the reflected pump and probe beams as a function of pump modulation frequency, f, is unique to the material that is being measured.

Density and Heat Capacity

Density and heat capacity of the [Co][PCBM]n mixtures were calculated as a weighted average given the stoichiometric ratio defined by n and the respective material properties of their two constituents.

$$\rho_{[Co][PCBM]_n} = \frac{M_{[Co][PCBM]_n}}{V_{[Co][PCBM]_n}} \quad (1)$$

where ρ represents the density, M represents the molar mass and V represents the molar volume of the mixture. This expression can be expanded in terms of individual constituent properties:

$$\rho_{[Co][PCBM]_n} = \frac{M_{[Co][PCBM]_n}}{V_{[Co][PCBM]_n}} = \frac{M_{[Co]} n M_{[PCBM]}}{M_{[Co]}/\rho_{[Co]} + n M_{[PCBM]}/\rho_{[PCBM]}} \quad (2)$$

Heat capacity of the mixtures was calculated as follows:

$$C_{[Co][PCBM]_n} = \frac{\frac{C_{[Co]} M_{[Co]}}{\rho_{[Co]}} + \frac{n C_{[PCBM]} M_{[PCBM]}}{\rho_{[PCBM]}}}{M_{[Co]} + n M_{[PCBM]}} \quad (3)$$

where c represents specific heat, and C represents volumetric heat capacity. The volumetric heat capacity of [PCBM] was obtained from previous work and the heat capacity of [Co] was measured using differential scanning calorimetry. The density and heat capacity of the materials pf the materials is provided in Table 5.

TABLE 5

Density and heat capacity

| Samples | Density (kg/m³) | Heat Capacity (J kg$^{-1}$K$^{-1}$) |
|---|---|---|
| [Co][PCBM]$_2$ | 1761 | 772 |
| [Co][PCBM]$_3$ | 1736 | 755 |
| [Co][PCBM]$_4$ | 1719 | 742 |
| [Co][PCBM]$_5$ | 1706 | 733 |
| [Co][PCBM]$_7$ | 1690 | 721 |
| [Co][PCBM]$_9$ | 1680 | 713 |
| [Co] | 1879 | 850 |
| [PCBM] | 1631 | 674 |

Figure 50:
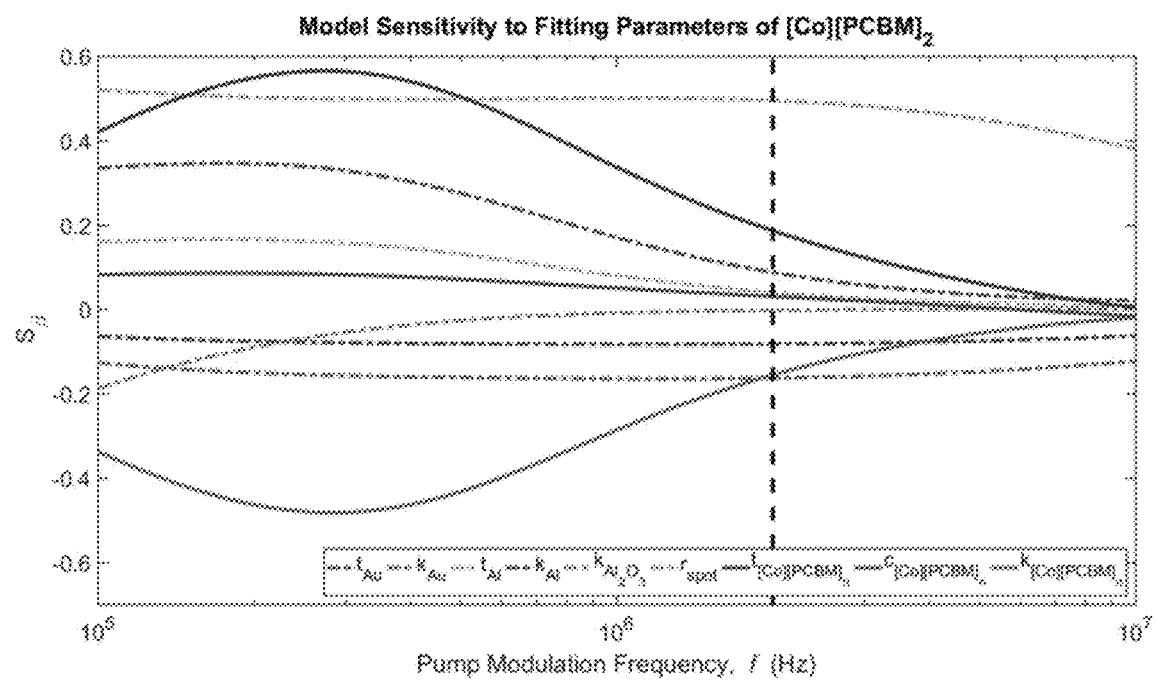
FIG. 50 provides normalized sensitivity of the fitting model to several input parameters for modulation frequency of 100 kHz-10 MHz.
Figure 51:
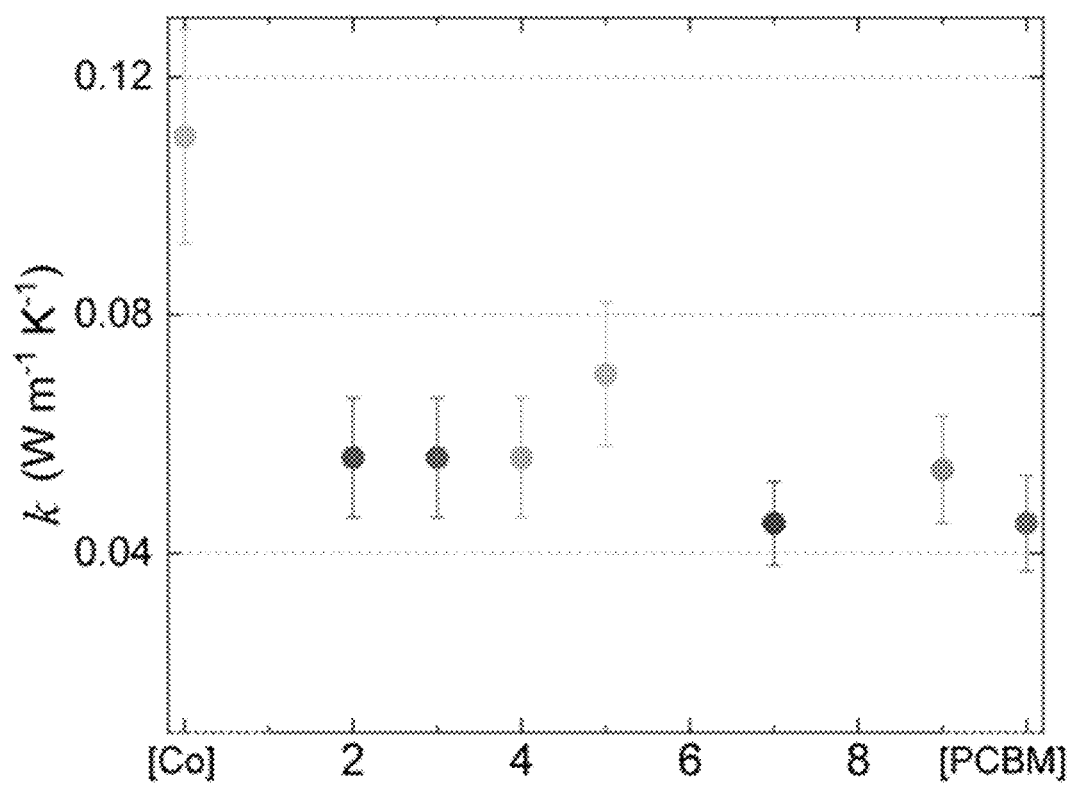
FIG. 51 provides room temperature k of superatomic thin films with uncertainties.

The density and heat capacity of these materials was not directly measured so operating conditions of FDTR were selected to make the extracted thermal conductivities insensitive to these values. Since the thermal time constants of the films $$\left( \frac{t^2_{[Co][PCBM]_n}}{\alpha_{[Co][PCBM]_n}}, \right.$$

where $t_{[Co][PCBM]_n}$ is film thickness and $\alpha_{[Co][PCBM]_n}$ is thermal diffusivity) are small compared to 1/f (where f is the pump modulation frequency), the predicted film temperatures are approximately steady state and therefore insensitive to $C_{[Co][PCBM]_n}$. This is illustrated in FIG. 50, which demonstrates the fitting model's insensitivity to the specific heat of [Co][PCBM]$_2$ compared to other parameters. FDTR data was collected for the frequency range of 100 kHz to 2-Mz, delineated by the dashed black line. Material properties of [Co][PCBM]n are shown as solids lines. The model is most sensitive to the [Co][PCBM]$_n$ thickness and thermal conductivity, as well as laser spot size. By contrast, it is insensitive to the [Co][PCBM]$_2$ heat capacity.

The total number of measurements, the average nominal thermal conductivity, and combined uncertainty of each mixture are shown in Table 6. The number of measurements made was based upon the consistency of the data obtained. It should be noted that the k of the amorphous [Co] film (0.11±0.02 W m$^{-1}$ K$^{-1}$) is lower than k of the similar crystalline cluster, Co$_6$Te$_8$(PEt$_3$)$_6$, (0.13 W m$^{-1}$ K$^{-1}$), presumably due to shorter lifetimes of the vibrational energy carriers in amorphous relative to crystalline materials. The k of the [PCBM] film (0.05±0.01 W m$^{-1}$ K$^{-1}$) is comparable to other known reports. Data for pure [Co] and [PCBM] are included for comparison.

TABLE 6

Nominal Thermal Conductivity

| Samples | N | k (W m$^{-1}$ K$^{-1}$) | σ (W m$^{-1}$ K$^{-1}$) |
|---|---|---|---|
| [Co][PCBM]$_2$ | 2 | 0.056 | 0.010 |
| [Co][PCBM]$_3$ | 4 | 0.056 | 0.010 |
| [Co][PCBM]$_4$ | 3 | 0.056 | 0.010 |
| [Co][PCBM]$_5$ | 10 | 0.070 | 0.012 |
| [Co][PCBM]$_7$ | 3 | 0.045 | 0.007 |
| [Co][PCBM]$_9$ | 3 | 0.054 | 0.009 |
| [Co] | 3 | 0.110 | 0.018 |
| [PCBM] | 4 | 0.045 | 0.008 |

Thermoelectric Measurement

Figure 52:
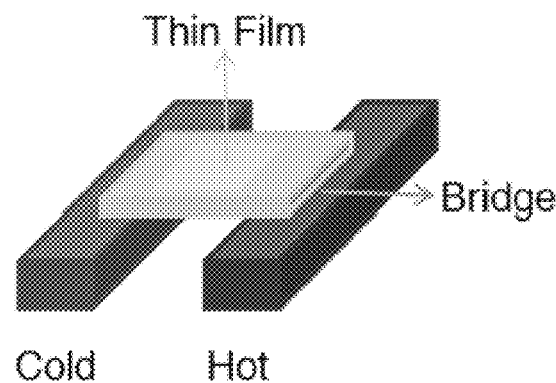
FIG. 52 provides a schematic of the Seebeck coefficient measurement platform.
Figure 53:
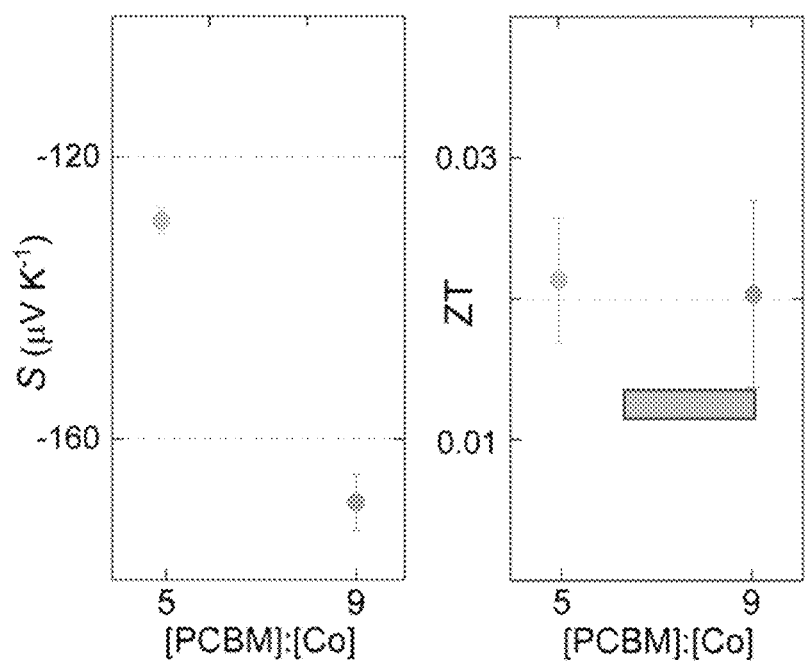
FIG. 53 provides Seebeck coefficients S [−129 (2) μV/K and ~169 (4) μV/K] and ZT values [0.0213 (0.0044) and 0.0203 (0.0066)] of [Co][PCBM]$_5$ and [Co][PCBM]$_9$ at room temperature.

In-house Seebeck coefficient measuring setup was assembled using two ceramic heaters held at known temperatures (18.5 and 34.5° C.) with copper tapes making thermal and electrical contact to the thin film sample spin-coated on 1 inch by 1 inch VMR micro cover glasses, as shown in FIG. 52. The Seebeck voltage was measured using an Agilent B2901A precision source/measure unit. Seebeck coefficients (S) of −129 μV/K and ~169 μV/K were obtained for [Co][PCBM]$_5$ and [Co][PCBM]$_9$, respectively, as shown in FIG. 53.

In addition to the various embodiments depicted and claimed, the disclosed subject matter is also directed to other embodiments having other combinations of the features disclosed and claimed herein. As such, the particular features presented herein can be combined with each other in other manners within the scope of the disclosed subject matter such that the disclosed subject matter includes any suitable combination of the features disclosed herein.

The foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the methods and systems of the disclosed subject matter without departing from the spirit or scope of the disclosed subject matter. Thus, it is intended that the disclosed subject matter include modifications and variations that are within the scope of the appended claims and their equivalents.

The invention claimed is:

1. An ionic superatomic material comprising a metal-containing superatom and a fullerene derivative,
   wherein the metal-containing superatom is selected from the group consisting of $Co_6Te_8(PR_1R_2R_3)_6$, $Co_6Se_8(PR_1R_2R_3)_6$, $Ni_9Te_6(PR_1R_2R_3)_8$, $Cr_6Se_8(PR_1R_2R_3)_6$, $Cr_6Te_8(PR_1R_2R_3)_6$, $Re_6Se_8(PR_1R_2R_3)_6$, $Re_6Te_8(PR_1R_2R_3)_6$, $Au_{25}(SR)_{18}$, $Au_{38}(SR)_{24}$, and derivatives thereof, and
   wherein the fullerene derivative is selected from the group consisting of $C_{20}$, $C_{70}$, $C_{72}$, $C_{74}$, $C_{76}$, $C_{78}$, $C_{80}$, $C_{82}$, $C_{84}$, $C_{86}$, $C_{88}$, $C_{90}$, [6,6]-phenyl-C61-butyric acid methyl ester (PCBM), C60-COOH, C70-COOH, pyrazolino[60]fullerene, methano[60]fullerene, isoxazolino[60]fullerene, [60]ThCBM, [60]PCB-C8, [60]PCB-C4, and [70]PCBM,
   wherein $R_1$, $R_2$, and $R_3$ are independently straight or branched chain $C_3$-$C_{20}$ alkyl groups.

2. The ionic superatomic material of claim 1, wherein the ratio of the metal-containing superatom to the fullerene derivative is selected to control properties of ionic superatomic material.

3. The ionic superatomic material of claim 1, wherein $R_1=R_2=R_3=$n-propyl.

4. The ionic superatomic material of claim 1, wherein the fullerene derivative is [6,6]-phenyl-C61-butyric acid methyl ester.

5. The ionic superatomic material of claim 1, wherein the ionic superatomic material is $[Co_6Te_8(PPr_3)_6]$[[6,6]-phenyl-C61-butyric acid methyl ester]$_x$, wherein x is selected from the group consisting of 2, 3, 4, 5, 7, and 9.

6. An amorphous thin film comprising the superatomic material of claim 1.

7. The amorphous thin film of claim 6, wherein the thin film has a thermal conductivity of about 0.05 W m$^{-1}$ K$^{-1}$.

8. The amorphous thin film of claim 6, wherein the amorphous thin film has an optical transparency of up to 92% in the visible spectrum.

9. The amorphous thin film of claim 6, wherein the amorphous thin film has an optical transparency of from about 75% to about 85% at 550 nm.

10. A consumer product comprising the amorphous thin film of claim 6.

11. The consumer product of claim 10, wherein the consumer product is selected from the group consisting of wearable electronics, stretchable and flexible electronics, smart robotics systems, transparent thermal insulation coatings, printable electronics, touch screen devices, thin-film thermoelectric device, and temperature sensors.

12. A method of controlling electrical conductivity of an amorphous thin film comprising $Co_6Te_8(PR_1R_2R_3)_6$ and a fullerene derivative, wherein the method comprises adjusting a ratio of $Co_6Te_8(PR_1R_2R_3)_6$ and a fullerene derivative from about 1:1 to about 1:10, wherein the fullerene derivative is selected from the group consisting of $C_{20}$, $C_{70}$, $C_{72}$, $C_{74}$, $C_{76}$, $C_{78}$, $C_{80}$, $C_{82}$, $Cde_{84}$, $C_{86}$, $C_{88}$, $C_{90}$, [6,6]-phenyl-C61-butyric acid methyl ester (PCBM), C60-COOH, C70-COOH, pyrazolino[60]fullerene, methano[60]fullerene, isoxazolino[60]fullerene, [60]ThCBM, [60]PCB-C8, [60]PCB-C4, and [70]PCBM, wherein $R_1$, $R_2$, and $R_3$ are independently straight or branched chain $C_3$-$C_{20}$ alkyl groups.

13. The method of claim 12, wherein $Co_6Te_8(PR_1R_2R_3)_6$ and the fullerene derivative are mixed in a ratio of about 1:5.

14. The method of claim 13, wherein the amorphous thin film comprises $[Co_6Te_8(PPr_3)_6]$[6,6]-phenyl-C61-butyric acid methyl ester]$_5$.

15. A method of controlling thermal conductivity of an amorphous thin film comprising $Co_6Te_8(PR_1R_2R_3)_6$ and a fullerene derivative, wherein the method comprises adjusting a ratio of $Co_6Te_8(PR_1R_2R_3)_6$ and a fullerene derivative, wherein the fullerene derivative is selected from the group consisting of $C_{20}$, $C_{70}$, $C_{72}$, $C_{74}$, $C_{76}$, $C_{78}$, $C_{80}$, $C_{82}$, $Cde_{84}$, $C_{86}$, $C_{88}$, $C_{90}$, [6,6]-phenyl-C61-butyric acid methyl ester (PCBM), C60-COOH, C70-COOH, pyrazolino [60] fullerene, methano [60]fullerene, isoxazolino [60] fullerene, [60] ThCBM, [60]PCB-C8, [60]PCB-C4, and [70]PCBM, wherein $R_1$, $R_2$, and $R_3$ are independently straight or branched chain $C_3$-$C_{20}$ alkyl groups.

16. The method of claim 15, wherein the method comprises adjusting a ratio of $Co_6Te_8(PR_1R_2R_3)_6$ and the fullerene derivative from about 1:1 to about 1:10.

17. The method of claim 16, wherein $Co_6Te_8(PR_1R_2R_3)_6$ and the fullerene derivative are mixed in a ratio of about 1:5.

* * * * *

UNITED STATES PATENT AND TRADEMARK OFFICE
CERTIFICATE OF CORRECTION

| | | |
|---|---|---|
| PATENT NO. | : 12,104,114 B2 | Page 1 of 1 |
| APPLICATION NO. | : 16/917758 | |
| DATED | : October 1, 2024 | |
| INVENTOR(S) | : Nuckolls et al. | |

It is certified that error appears in the above-identified patent and that said Letters Patent is hereby corrected as shown below:

In the Specification

Column 1, Lines 13-18, delete the paragraph and insert the following:
--This invention was made with government support under 1420634 awarded by the National Science Foundation, DA9550-18-1-0200 awarded by the Air Force Office of Scientific Research, and W911NF-17-1-0397 awarded by the Army Research Office. The government has certain rights in the invention.--

Signed and Sealed this
Twelfth Day of November, 2024

Katherine Kelly Vidal
*Director of the United States Patent and Trademark Office*